United States Patent
Ohnishi et al.

(10) Patent No.: US 6,181,356 B1
(45) Date of Patent: Jan. 30, 2001

(54) PATTERN IMAGE READER DEVICE AND IMAGE STABILIZER DEVICE INCORPORATED IN IMAGE FORMING APPARATUS

(75) Inventors: Kazuyuki Ohnishi, Yamatokoriyama; Yoichi Shimazawa, Nara; Syoichiro Yoshiura, Tenri, all of (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 09/110,609

(22) Filed: Jul. 6, 1998

(30) Foreign Application Priority Data

Jul. 29, 1997 (JP) .................................................. 9-203359

(51) Int. Cl.[7] ............................ B41J 2/385; G01D 15/06; G03G 15/01
(52) U.S. Cl. .......................................... 347/116; 347/131
(58) Field of Search ..................................... 347/115, 116, 347/131, 133; 399/49, 51, 53, 55, 60, 301

(56) References Cited

U.S. PATENT DOCUMENTS 5,329,339 * 7/1994 Sakamoto et al. ...................... 399/55
5,373,355 * 12/1994 Ando et al. ........................... 347/116

FOREIGN PATENT DOCUMENTS 63-280275    11/1988   (JP) .

* cited by examiner

*Primary Examiner*—Sandra Brase
(74) *Attorney, Agent, or Firm*—Dike, Bronstein, Roberts & Cushman, LLP; David G. Conlin

(57) ABSTRACT

An object of the present invention is to offer an image stabilizer device capable of effectively improving quality of images produced by an image forming apparatus of a type that changes the size of a basic pixel by controlling an irradiation time of write-in light, and to offer a pattern image reader device used for the purpose. A pattern image reader device 100 is constituted by a reader unit 2 that at least contains a semiconductor laser 3, converging lens 6, and photosensor 5 for reading the amount of reflected light, and the driving section 7 that contains a drive coil 7c for moving the reader unit 2 in the principal scanning direction, and can measure on the order of microns the size of a toner image formed on the surface of a transfer and transport belt 26 in the principal scanning direction by monitoring the output of the photosensor 5 while moving in the principal scanning direction under the control by the CPU 48. The CPU 48 thereafter corrects lookup tables 45a to 45d according to the dot diameter measured in the principal scanning direction.

29 Claims, 18 Drawing Sheets

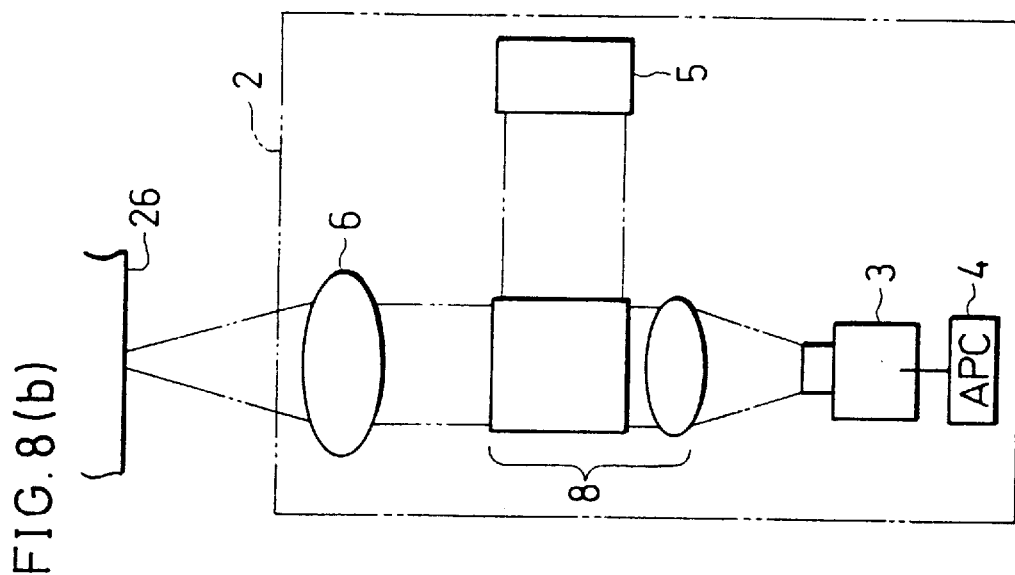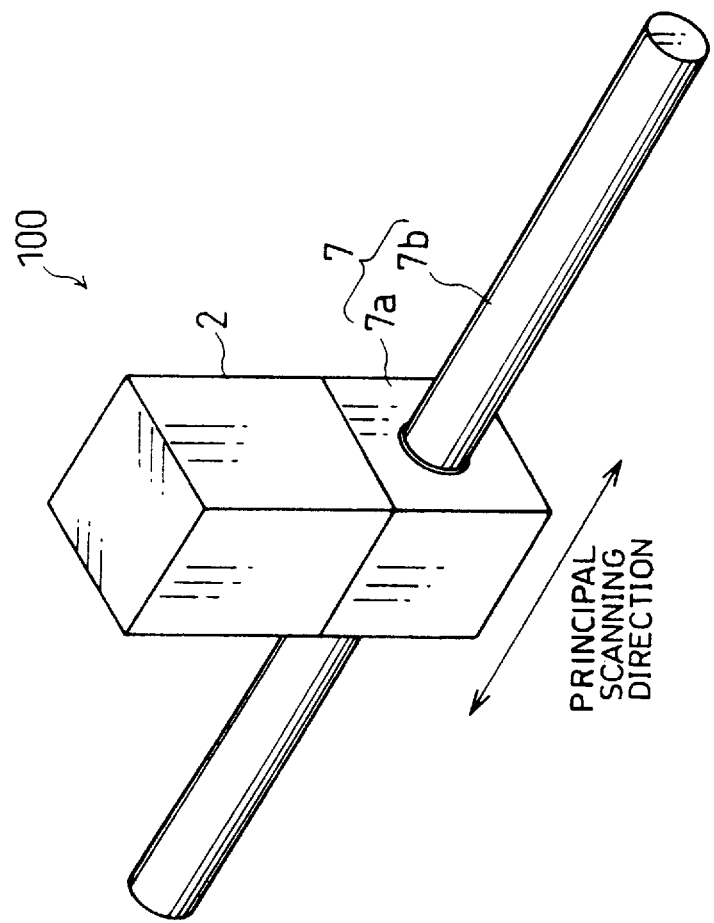
FIG. 8(b)
FIG. 8(a)

PATTERN IMAGE READER DEVICE AND IMAGE STABILIZER DEVICE INCORPORATED IN IMAGE FORMING APPARATUS

FIELD OF THE INVENTION

The present invention relates to an image stabilizer device for stabilizing images through the control of image forming conditions for an image forming section and to a pattern image reader device for conducting an image stabilizing process, both of which devices are incorporated in an electrophotographic type image forming apparatus such as a digital copying machine and a laser printer.

BACKGROUND OF THE INVENTION

A conventional method for electrophotographic type image forming apparatuses, such as digital copying machines and laser printers, effects tone by changing the size of basic pixels (one dot). However with such an electrophotographic method which employs photoreceptor bodies, environmental factors such as humidity causes changes in properties of, for example, the photoreceptor body, the developer agent for developing electrostatic images formed on the photoreceptor body by exposure, and the electric charger device for charging the photoreceptor body. The pixels consequently varies in size even under the same image forming conditions, posing a problem in effecting good tone display.

So "image stabilizer devices" have been developed to stabilize images by preventing deterioration thereof due to aging and environmental changes such as humidity and temperature through the control of image forming conditions for the image forming section, such as charging, exposure, and developing. Such a control of image forming conditions for the image forming section to stabilize images will be referred hereinafter to as a process control.

For instance, a toner image is formed for test purposes under predetermined conditions on a photoreceptor body or on a transfer medium, such as a transfer body or intermediate transfer body, provided as a photoreceptor body. The amount of light reflected at an area of less than ten square centimeters is then measured by a reflection type optical sensor. Finally, a process control is conducted based on the differences between the measured value and the reference value. This method is embodied for example with two toner images of different densities, i.e. bright and dark, and two reflection type sensors for measuring the densities thereof.

However, with reflection type sensor reading merely average densities, the method falls short of telling whether the difference between the measured value and the reference value is caused by a change of a pixel in size or an increase or decrease in the amount of adhering toner per unit area. The accompanying result is an unsatisfactory process control and ineffectual image stabilization.

To solve such problems, Tokukaisho 63-280275 (Japanese Laid-Open Patent Application No. 63-280275/ 1987) discloses a process control being conducted by means of a linear toner image formed on a transfer belt so as to extend in the principal scanning direction (corresponding to the scanning direction of the laser beam, which is perpendicular to the direction of the rotation of the transfer belt) and a reflection type sensor reading the size of the toner image in the auxiliary scanning direction (perpendicular to the principal scanning direction), i.e. the line width.

Another method actively in commercial use is to employ a CCD (Charge Coupled Device) line sensor for reading, for example, the position of the toner image formed on the transfer belt.

As mentioned above, in digital copying machines and other devices, an electrostatic image is formed by the scanning with laser light, and tone display is effected by pulse-modulating the image data and thus controlling the ON time in a single pixel. As a result, the formed pixel varies in size in the principal scanning direction depending on tone, whereas hardly in the auxiliary scanning direction. The size in the auxiliary scanning direction is determined by the beam diameter of the laser light.

Therefore, the process control based on the measurement of the size of an elemental pixel in the auxiliary scanning direction as disclosed in Tokukaisho 63-280275 above does not always offer satisfactory levels of control.

In addition, Tokukaisho 63-280275 discloses measurement, using reflection type sensor, of the line width of the toner image formed on the transfer belt, but it does not elaborate on the configuration of the reflection type sensor. A typical reflection type sensor covers an area of not less than a few square centimeters at a single reading, and it is highly unlikely that such a sensor is capable of detecting the size of the pixels for a digital copying machine or printer having a resolution of a few hundred dpi.

On the other hand, in a configuration where a CCD line sensor is used to read the pattern, it is possible to detect the size of the pixels for a digital copying machine and printer having a resolution of a few hundred dpi. Nevertheless, CCD line sensors allow only limited freedom in spatial arrangement due to their relatively large sizes, and are more costly than reflection type sensors and other devices. In addition, the CCD line sensor includes a plurality of integrated photoreceptor elements and therefore requires compensation for variations between those photoreceptor elements, resulting in a complex drive circuit and increased costs.

SUMMARY OF THE INVENTION

In view of the problems, an object of the present invention is to offer an image stabilizer device capable of effectively conducting a process control for an image forming apparatus that determines the size of the basic pixel by controlling the ON time of write-in light. Another object is to offer a pattern image reader device suitably incorporated to conduct image stabilizing processes.

In order to solve the problems, a pattern image reader device in accordance with the present invention, incorporated in an image forming apparatus, for reading a pattern image formed on an image carrier body such as a photoreceptor body or a transfer belt and obtaining a size or position of the pattern image, the pattern image reader device including:
  a pattern image reading sensor including:
    a semiconductor laser for irradiating the image carrier body with light;
    a lens for converging the light from the semiconductor laser at the image carrier body; and
    a light receiving element for receiving reflected light from the image carrier body and generating for output an electric signal that changes with the amount of light received, and measuring means for obtaining a size or position of the pattern image in a direction in which the pattern image reading sensor and the image carrier body change relative positions thereof according to a change in output of the light receiving element with the change in the relative positions.

With the arrangement, the size or position of the pattern image is obtained by the measuring means in a direction in which the pattern image reading sensor and the image carrier body change relative positions thereof according to a change in output of the light receiving element with the change in the relative positions.

The pattern image reading sensor has a smaller reading area than does a reflection type sensor, since the patter image reading sensor includes an arrangement to irradiate the image carrier body with laser light emitted by the semiconductor laser and converged by the lens, receive reflected light from the image carrier body, and generate for output an electric signal that changes with the amount of light received. Therefore, by moving the pattern image reading sensor relative to the image carrier body, or move the image carrier body change relative positions relative to the pattern image reading sensor, and monitoring the output of the patter image reading sensor during the movement, the size or position of the pattern image is obtained in a direction in which the pattern image reading sensor and the image carrier body change relative positions thereof.

In this manner, the pattern image reader device in accordance with the present invention permits the detection of size of basic pixels for a digital copying machine and printer having a resolution of a few hundred dpi. Therefore, the pattern image reader device realizes an effectual process control by the use thereof for a process control for stabilizing images for an image forming apparatus that produces tones by changing the sizes of the basic pixels.

The pattern image reader device in accordance with the present invention having the arrangement as above preferably further includes:

drive means for moving the pattern image reading sensor in a predetermined direction;

position detection means for detecting a position of the pattern image reading sensor during the movement; and control means for controlling a timing for the measuring means to sample the output of the light receiving element according to a result of the detection by the position detection means.

With the arrangement, the pattern image reading sensor is moved by the driving means in a predetermined direction. In a case where such a pattern image reading sensor is moved, the size of the pattern image, as an example, is obtained according to the results of sampling the output of the pattern image reading sensor every predetermined period of time and the distance by which the pattern image reading sensor is moved during that period. However, in such a case, if the pattern image reading sensor does not move at a constant speed, it becomes difficult to measure the distance covered during the predetermined period of time precisely, and thus to measure the size and position of the pattern image.

With the above arrangement, i.e., by detecting the position of the pattern image reading sensor during the movement with the position detection means, and controlling with the controlling means the timing to sample the output of the pattern image reading sensor, even if the pattern image reading sensor does not move at a constant speed, the sampling (reading) position can be precisely recognized, and hence the size and position of the pattern image can be precisely obtained.

The following is a description of an example of the position detection means in accordance with the present invention.

The position detection means includes:

a position reference pattern disposed corresponding to a pattern image forming position on the image carrier body; and a position reference pattern reading sensor moving integrally with the pattern image reading sensor and including: a semiconductor laser for irradiating the position reference pattern with light; a lens for converging the light from the semiconductor laser at the position reference pattern; and a light receiving element for receiving reflected light from the position reference pattern and generating for output an electric signal that changes with the amount of light received.

Thus, the position of the pattern image reading sensor is surely obtained by reading the position reference pattern disposed corresponding to a pattern image forming position on the image carrier body with a position reference pattern detection means that has the same arrangement as, and is driven integrally with, the pattern image reading sensor.

Moreover, in any of the above arrangements, the pattern image reader device in accordance with the present invention is preferably such that power stabilizer means is provided to the semiconductor laser for stabilizing laser power, and laser is used for reading when the laser power is stabilized.

With the arrangement, the size and position of the pattern image is precisely obtained even if laser light with which the amount of light tends to change is used.

In order to solve the problems, an image stabilizer device in accordance with the present invention, incorporated in an image forming apparatus including an image forming section, the image stabilizer device being for stabilizing an image by controlling image forming conditions for the image forming section, the image forming section being for forming an image by writing an electrostatic latent image through irradiation of a photoreceptor body with light and then visualizing the electrostatic latent image through development thereof, the image forming apparatus having an arrangement in which sizes of basic pixels are changed by changing an irradiation time for the write-in light, the image stabilizer device including:

dot image forming means for forming a visual image of one dot on the photoreceptor body;

dimension measuring means for measuring a dimension in a principal scanning direction of the dot image formed by the dot image forming means either directly on the photoreceptor body or on a transfer medium onto which the dot image is transferred; and control means for controlling image forming conditions according to the dimension of the dot image in the principal scanning direction measured by the dimension measuring means.

With the above arrangement, the image is stabilized by the dot image forming means forming a visual image of one dot on the photoreceptor body, the dimension measuring means measuring, and thus obtaining, the dimension in a principal scanning direction of the dot image formed by the dot image forming means, and the control means controlling image forming conditions according to the dimension measured of the dot image in the principal scanning direction.

Therefore, the image stabilizer device in accordance with the present invention, when being incorporated in an image forming apparatus effecting multiple tone display by varying the sizes of the basic pixels through variations in irradiation time with write-in light, can effectively control image forming conditions, and effectively execute a process control.

For a fuller understanding of the nature and advantages of the invention, reference should be made to the ensuing detailed description taken in conjunction with the accompanying drawings.

BRIEF DESCRIPTION OF THE DRAWINGS

FIG. 8(a) is a perspective view showing a configuration of a pattern image reader device for reading pattern images for measurement use, and FIG. 8(b) is a drawing showing a configuration of a reader unit incorporated in a pattern image reader device.

DESCRIPTION OF THE EMBODIMENTS

[First Embodiment]

Referring to FIGS. 1 through 8(a) and 8(b), the following description will discuss an embodiment in accordance with the present invention.

Figure 2:
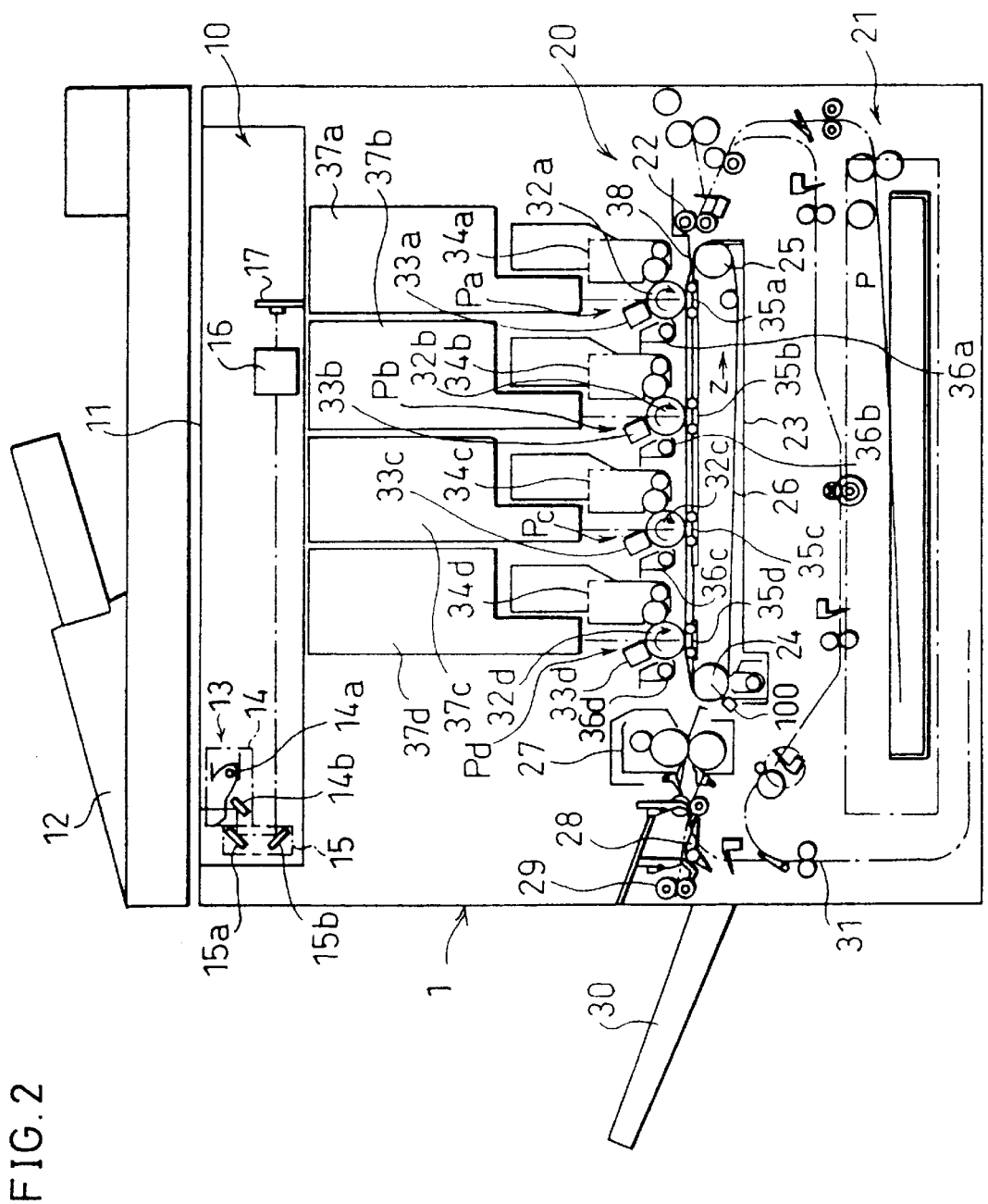
FIG. 2 is a schematic drawing showing an overall configuration of a digital color copying machine incorporating the image stabilizer device.

As shown in FIG. 2, a digital color copying machine as the image forming apparatus of the present embodiment includes an document platen 11 disposed on the upper surface of a copying machine main body 1 and an image reader section 10 and an image forming section 20 disposed inside the digital color copying machine 1.

Disposed on the upper surface of the document platen 11 is an automatic document feeder 12 that is attached to the document platen 11 at a predetermined position relative to the upper side of the document platen 11 so that the automatic document feeder 12 can be opened and closed.

The automatic document feeder 12 is a recirculating automatic document feeder (RADF) that can handle double sided original documents. The automatic document feeder 12 transports an original document so that one of the sides of the original document faces the image reader section 10 at a predetermined place on the document platen 11. After the completion of reading the image on that side of the original document, the automatic document feeder 12 reverses and transports the original document to the document platen 11 so that the other side of the original document faces the image reader section 10 at a predetermined place on the document platen 11. After the completion of reading images on both sides of the original document, the automatic document feeder 12 ejects the original document and conducts a new round of the transporting operation for another double sided original document. The transporting and reversing operations are controlled in relation to the operations by the entire digital color copying machine.

The image reader section 10 is disposed beneath the document platen 11 to read images on the original document transported by the automatic document feeder 12 onto the document platen 11, and includes an optical lens 16, a three-lined CCD line sensor 17, and a document scanning body 13 that moves back and forth along the under surface of the document platen 11.

The document scanning body 13 is constituted by a first scanning unit 14 and a second scanning unit 15. The first scanning unit 14 includes an exposure lamp 14a for exposing a side of the original document on which an image is found and a first mirror 14b for directing an reflected image of the original document to a predetermined direction. The first scanning unit 14 moves back and forth at a predetermined scanning speed parallel to the under surface of the document platen 11, maintaining a predetermined distance from the document platen 11. The second scanning unit 15 includes second and third mirrors 15a and 15b for directing the reflected image of the original document that has been directed by the first mirror 14b of the first scanning unit 14 to a predetermined direction. The second scanning unit 15 moves back and forth parallelly at a predetermined relative speed to the first scanning unit 14.

The reflected image of the original document directed by the third mirror 15b of the second scanning unit 15 is converged by the optical lens 16 onto the CCD line sensor 17. The image converged onto the CCD line sensor 17 is converted opto-electrically by the CCD line sensor 17 into electric signals for an output. The original document data converted into electric signals by the CCD line sensor 17 is then transmitted to an image processing section that is to be mentioned later and undergoes a predetermined process as image data.

A paper feeding mechanism 21, being disposed in the lower part of the image forming section 20, separates sheets of paper P stacked in a paper tray and supplies them, sheet by sheet, to a recording section. The sheet of paper P, being separated and supplied, is transported at a proper timing by a pair of resist rollers 22 located before the image forming section 20, and subsequently supplied and transported again in conjunction with the image forming section 20 for reversion and double side copying.

A transfer and transport belt mechanism 23 is disposed above the paper feeding mechanism 21 of the image forming section 20 so as to span parallelly. The transfer and transport belt mechanism 23 is configured so that the sheet of paper P is attracted electrostatically to, and transported by, a transfer and transport belt 26 stretching over a plurality of rollers such as a drive roller 24 and an auxiliary roller 25.

Down from the transfer and transport belt mechanism 23 is disposed a fixing device 27 for fixing onto the sheet of paper P a toner image formed on the sheet of paper P by transfer. The sheet of paper P passes between fixing roller nips of the fixing device 27, passes through a transport direction switching gate 28, and is ejected by ejection rollers 29 onto a paper ejection tray 30 attached to an outer wall of the digital color copying machine 1.

The switching gate 28 is for selectively switching the sheet transport path for the sheet of paper P after fixing, between the ejection out of the digital color copying machine 1 and the resupply to the image forming section 20. The sheet of paper P, if the transport path is switched to the image forming section 20 by the switching gate 28, passes through a switch back transport path 31, becomes reversed, and resupplied to the image forming section 20.

First, second, third, and fourth image forming stations Pa, Pb, Pc, and Pd are disposed side by side close to, and above, the transfer and transport belt 26 of the image forming section 20 in this order along the direction of paper transport. The transfer and transport belt 26, being friction-driven by the drive roller 24 in the direction denoted by an arrow Z in FIG. 2, carries the sheet of paper P supplied by the paper feeding mechanism 21 as mentioned earlier and transport the sheet of paper P to the image forming stations Pa, Pb, Pc, and Pd.

The image forming stations Pa, Pb, Pc, and Pd practically share the same configuration, respectively including photoreceptor bodies 32a, 32b, 32c, and 32d that are driven to rotate in the direction denoted by arrows in FIG. 2. Respectively surrounding the photoreceptor bodies 32a, 32b, 32c, and 32d in the rotation direction of the photoreceptor bodies 32a, 32b, 32c, and 32d are chargers 33a, 33b, 33c, and 33d for uniformly charging the photoreceptor bodies 32a, 32b, 32c, and 32d; developing devices 34a, 34b, 34c, and 34d for developing electrostatic images formed on the photoreceptor bodies 32a, 32b, 32c, and 32d; transfer dischargers 35a, 35b, 35c, and 35d for transferring the developed toner image onto the sheet of paper P; and cleaning devices 36a, 36b, 36c, and 36d for removing residual toner on the photoreceptor bodies 32a, 32b, 32c, and 32d.

Also disposed above the photoreceptor bodies 32a, 32b, 32c, and 32d are semiconductor lasers for writing purpose for emitting dot light modulated according to the image data, directing devices for directing the light originating at the semiconductor laser to the principal scanning direction, and laser beam scanner units (will be hereinafter referred to as LSUs) 37a, 37b, 37c, and 37d that include fθ lenses for converging the laser light directed by the directing devices onto the surfaces of the photoreceptor bodies (none shown).

The pixel data corresponding to the yellow component image of a color original document image is coupled to the input of the LSU 37a, the pixel data corresponding to the magenta component image to the input of the LSU 37b, the pixel data corresponding to the cyan component image to the input of the LSU 37c, and the pixel data corresponding to the black component image to the input of the LSU 37d.

This allows electrostatic images to be formed on the photoreceptor bodies 32a, 32b, 32c, and 32d of the recording sections according to the original document image information that has been converted in color. Also, since the developing devices 34a, 34b, 34c, and 34d store yellow, magenta, cyan, and black toner respectively, the original document image information that has been converted in color by the respective recording sections are reproduced as toner images of those colors.

Also, a charger 38 for paper attracting use constituted by a brush is disposed between the first image forming station Pa and the paper feeding mechanism 21 to charge the surface of the transfer and transport belt 26. The sheet of paper P supplied from the paper feeding mechanism 21 is thereby firmly attracted onto the transfer and transport belt 26 and transported from the first image forming station Pa to the fourth image forming station Pd without being displaced.

A discharger (not shown) for charge removing use is disposed almost right above the drive roller 24 between the fourth image forming station Pd and the fixing device 27. An a.c. voltage is applied to the discharger for charge removing use to separate the sheet of paper P electrostatically attracted onto the transfer and transport belt 26.

A pattern image reader device 100 is provided near the discharger for charge removing use opposite the drive roller 24 to read the toner image of the image pattern for measurement use formed on the transfer and transport belt 26. The pattern image reader device 100 is used for the later-mentioned image stabilizing process and will at present only be described in connection with its position in the digital color copying machine 1, and details will be described later.

The digital color copying machine with the configuration above uses paper P of a cut sheet shape. As a sheet of paper P is dispatched from a feeding cassette to the inside of the guide of a paper transport path of the paper feeding mechanism 21, the leading edge of the sheet of paper P is detected by a sensor (not shown) and stopped temporarily by the resist rollers 22 according to a detection signal generated by that sensor.

The sheet of paper P is then sent at a proper timing with the image stations Pa, Pb, Pc, and Pd toward the transfer and transport belt 26 that is rotating in the direction denoted by the arrow Z in FIG. 2. Here, since the transfer and transport belt 26 is charged to a predetermined level by the charger 38 for paper attracting use, the sheet of paper P is supplied in a stable manner as it passes through the image stations Pa, Pb, Pc, and Pd.

At the image stations Pa, Pb, Pc, and Pd, the toner images of the above-mentioned colors are formed and transferred to overlap on a supporting side of the sheet of paper P electrostatically attracted to the transfer and transport belt 26. Upon the completion of the image transfer by the fourth image station Pd, the sheet of paper P is peeled at its leading edge off the transfer and transport belt 26 by the discharger for charge removing use and guided to the fixing device 27. Finally, the sheet of paper P onto which the toner image is fixed is ejected onto the paper ejection tray 30 through a transfer material ejection port.

The above process is an ordinary image forming process by the present digital color copying machine. The image forming process is controlled by a CPU (Central Processing Unit), as control means, shown in FIG. 3.

Figure 3:
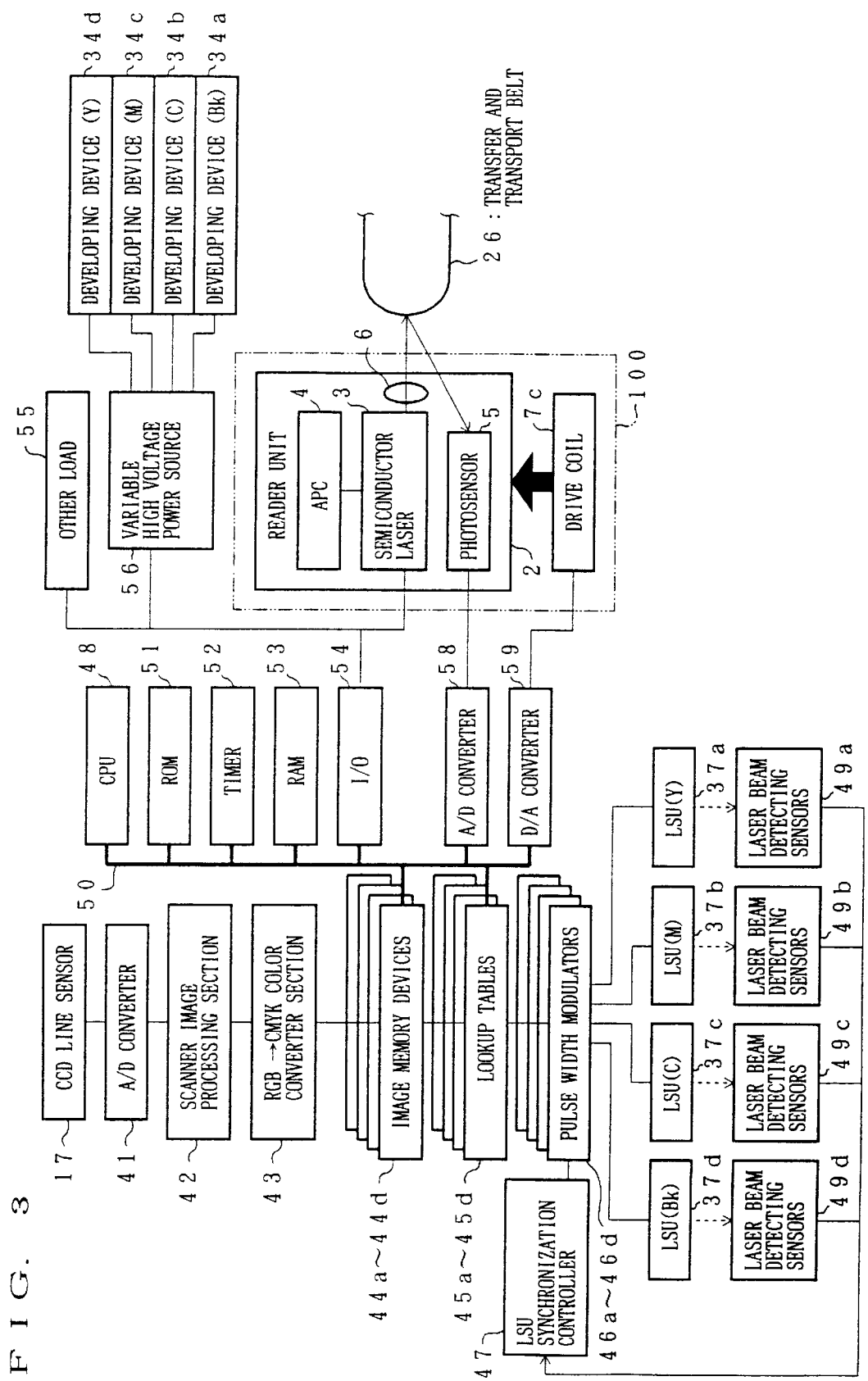
FIG. 3 is a block diagram showing configurations of an image processing section of the digital color copying machine and a pattern image reader device incorporated in the image stabilizer device to read pattern images for measurement use.

As shown in FIG. 3, the CPU (Central Processing Unit) 48 is connected via a bus 50 to a ROM device 51 for holding, for example, a control program, a RAM device 53 for holding numerical values and other data for control, and a timer 52 for executing time-related processes effectively, and via a parallel I/O 54 to a load circuit 55 constituting the present color digital copying machine. The CPU 48 therefore, for example, controls turning-on and -off of the load circuit 55, and sets operational conditions according to the control program for the image forming process stored on the ROM device 51 in order to conduct the above image forming process.

In the present color digital copying machine, the CPU 48 conducts the image stabilizing process as well as the image forming process. The image stabilizing process is for correcting through the control of image forming conditions unstable charging and other characteristics of the surfaces of the photoreceptor bodies 32a, 32b, 32c, and 32d and the developing devices 34a, 34b, 34c, and 34d due to deterioration thereof as a result of aging and environmental characteristics such as temperature and humidities (process control).

Figure 4:
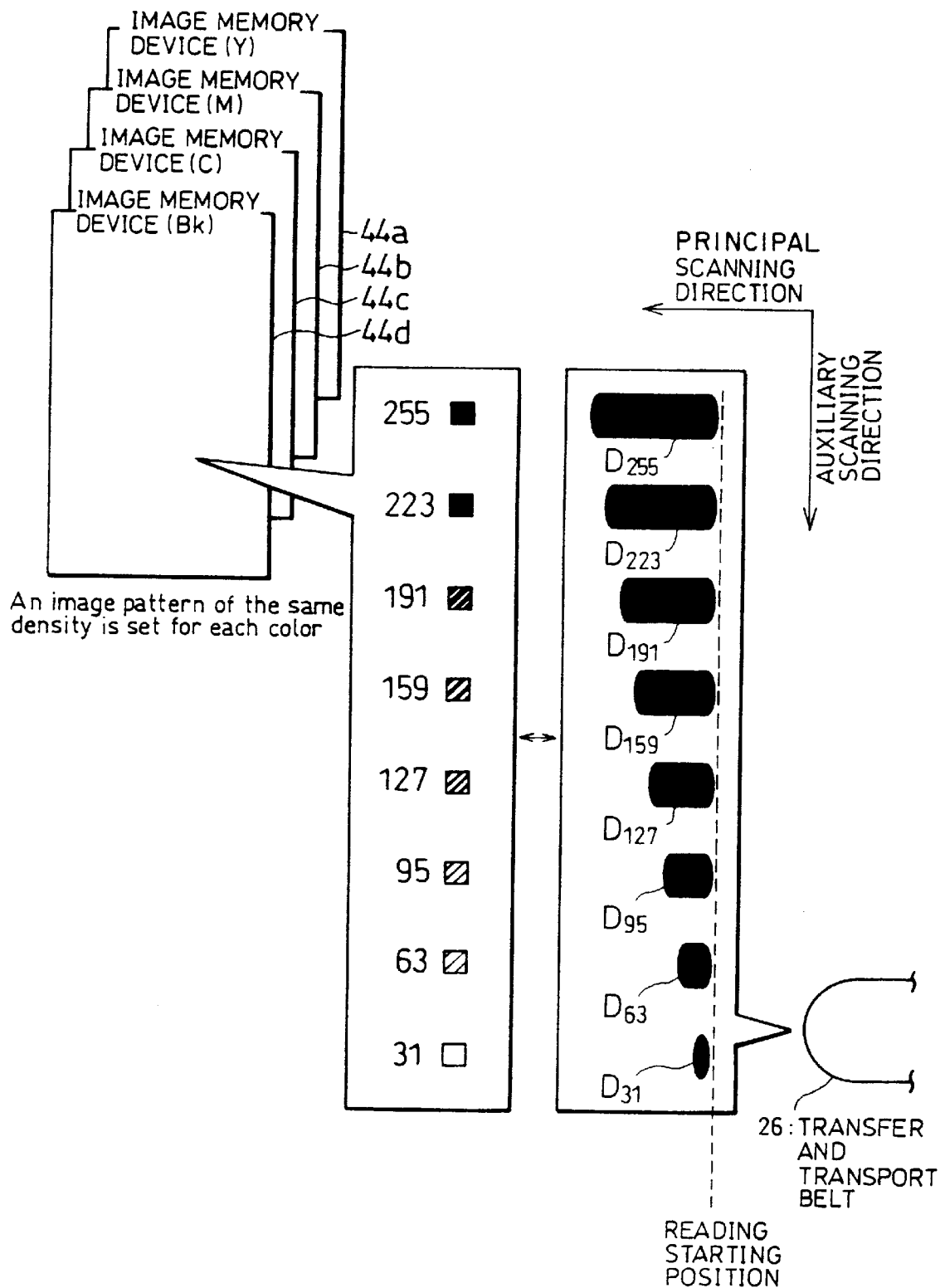
FIG. 4 is an explanatory drawing showing image patterns for measurement use employed in the image stabilizing process.

Detailed description will be given later about the image stabilizing process in reference to the flow block diagram in FIG. 1. To put it simple, dot images (single-dot toner images) $D_{31}$, $D_{63}$, $D_{95}$, $D_{127}$, $D_{159}$, $D_{191}$, $D_{223}$, and $D_{255}$ of eight tones similar to those shown in FIG. 4 are formed directly on the transfer and transport belt 26 as pattern images for measurement use. The sizes (dot spans) of the dot images are measured in the principal scanning direction. The image forming conditions are corrected according to those measurements. Here, it is arranged so that lookup tables 45a to 45d (will be described later in detail) shown in FIG. 3 are edited.

To explain functions of the lookup tabes 45a to 45d, the following description will explain a series of operations from the reading of the image information of the original document with the CCD line sensor 17 in the image reader section 10 shown in FIG. 2 and the execution of data processing such as image processing to the output as laser light modulated by the LSU 37a to 37d for the above-mentioned colors.

As shown in FIG. 3, the image information of the color original document image read line by line by the CCD line sensor 17 is coupled to the input of an A/D converter 41 as RGB image signals that are separated with respect to the red (R), green (G), and blue (B) colors. The RGB image signals here are of analogue values.

The A/D converter 41 converts the color-separated RGB signals from analogue values to 8-bit digital signals and transmits to a scanner image processing section 42. The scanner image processing section 42 executes various calculations on the RGB image signals to compensate for deterioration of the image caused by the CCD line sensor 17 and the optical system such as the mirror in the image reader section 10 before sending the RGB image signals to an RGB→YMCK color converter section 43.

The RGB→YMCK color converter section 43 executes color image processing on the RGB image signals to convert the signals to image data of yellow (Y), magenta (M), cyan (C), and black (Bk or K) colors and write into the respective image memory devices 44a to 44d. It is arranged so that the image memory device 44a holds the yellow image data, the image memory device 44b the magenta image data, the image memory device 44c the cyan image data, and the image memory device 44d the black image data.

Although FIG. 3 only shows the RGB→YMCK color converter section 43, an image processing section for performing other kinds of image, such as scaling processing, is positioned together with the RGB→YMCK color converter section 43, and the image memory devices 44a to 44d hold image data that has undergone all the image processing.

The image memory devices 44a to 44d are each composed of, for example, a dynamic RAM device, and the yellow, magenta, cyan, and black image data temporarily held in the image memory devices 44a to 44d are read out of the image memory devices 44a to 44d with time lags.

The reason for the image data of the above-mentioned colors to be read with time lags is as follows: The color image processing needs be executed color by color. Therefore, the image data of the above-mentioned colors generated by the RGB→YMCK color converter section 43 is written simultaneously with no time lags, whereas the photoreceptor bodies 32a to 32d for the above-mentioned colors are positioned next to each other above the transfer and transport belt 26. As a result, the images need be formed on the photoreceptor bodies 32a to 32d at different timings with time lags corresponding to the arrangement pitches among the photoreceptor bodies 32a to 32d (see FIG. 2).

The 8-bit image data of the above-mentioned colors read out of the image memory devices 44a to 44d with time lags are coupled to the input of the lookup tables 45a to 45d provided for the respective colors, converted by the lookup tables 45a to 45d to image data that are suitable to pulse width modulators 46a to 46d provided for the respective colors in the next stage, and coupled to the input of the pulse width modulators 46a to 46d. The lookup tables 45a to 45d are each composed of, for example, a high-speed static RAM device. The lookup tables 45a to 45d and the pulse width modulators 46a to 46d correspond to yellow, magenta, cyan, and black colors in alphabetical order.

The pulse width modulators 46a to 46d modulate the inputted 8-bit image data in pulse width and control the ON time of output signals that are coupled to the input of the LSUs 37a to 37d.

The LSUs 37a to 37d let the semiconductor lasers in the units to irradiate the photoreceptor bodies 32a to 32d with light and thus expose the photoreceptor bodies 32a to 32d to light for periods of time that are in accordance to PWM signals from the corresponding pulse width modulators 46a to 46d. The LSUs 37a to 37d are provided with respective laser beam detecting sensors 49a, 49b, 49c, and 49d that turn on upon detection of laser light. A laser beam enters the sensors 49a, 49b, 49c, and 49d every time the laser beam scans a line to give a starting signal for a single line to an LSU synchronization controller 47.

According to the inputted 8-bit image data, the pulse width modulators 46a to 46d control the ON time every 1/255 of a single pixel period when the LSUs 37a to 37d exposes and scans the photoreceptor bodies 32a to 32d. Electrostatic latent images with tones are formed on the photoreceptor bodies 32a to 32d according to the inputted image data.

However, since the pulse width modulators 46a to 46d divide a single pixel period equally by 255, the density of the formed toner image has unique gamma characteristics due to characteristics of the image forming system, and the desired particular gamma characteristics cannot be obtained by simply modulating the image data in pulse width. Therefore, the lookup tables 45a to 45d are provided to correct the input values to the pulse width modulators 46a to 46d so that the density of the actually formed toner image has the desired gamma characteristics, instead of directly coupling the values of the image data read out of the image memory devices 44a to 44d to the pulse width modulators 46a to 46d.

As already mentioned, the present color digital copying machine attempts to stabilize the image by rewriting the contents of the lookup tables 45a to 45d through the image stabilizing process. Therefore, the CPU 48 is connected via the bus 50 to the lookup tables 45a to 45d and the image memory devices 44a to 44d, and writes such image patterns to form the eight tone dot images $D_{31}$, $D_{63}$, $D_{95}$, $D_{127}$, $D_{159}$, $D_{191}$, $D_{223}$, and $D_{255}$ (see FIG. 4) for the image stabilizing process. In other words, the CPU 48 functions as dot image forming means.

The CPU 48 is also connected to the pattern image reader device 100 via the bus 50, double-functioning as measuring means for the pattern image reader device 100. Here, referring to FIGS. 8(a) and 8(b), a configuration of the pattern image reader device 100 will be explained first before the connection relation between the CPU 48 and the pattern image reader device 100 is explained.

The pattern image reader device 100, as shown in FIG. 8(a), is constituted by a reader unit (pattern image reading sensor, first optical sensor) 2 and a drive section (drive means) 7 for driving the reader unit 2 in the principal scanning direction. Among them, the reader unit 2 includes inside its housing a semiconductor laser 3, a converging lens 6, a photosensor (photoreceptor) 5, an optical system 8, and an APC (Auto Power Controller: power stabilizer means) 4. FIG. 8(b) shows the internal structure.

The semiconductor laser 3 is to generate laser light for reading toner images, and the converging lens 6 is to focus the light radiating from the semiconductor laser 3 on the transfer and transport belt 26. The photosensor 5 is to receive the light reflected by the transfer and transport belt 26, and couple electric signals to the input of the CPU 48 in accordance with the amount of the light received. The optical system 8 is to direct the laser light radiating from the semiconductor laser 3 to the converging lens 6 and direct the light reflected by the transfer and transport belt 26 to the photosensor 5.

The APC 4 is to control the electric current flowing through the semiconductor laser 3 so as to keep the amount of light emitted by the semiconductor laser 3. The reference in judgement is that the amount of the reflected light from the transfer and transport belt 26 monitored by the photosensor 5 should be within a certain level.

The APC 4 is provided inside the reader unit 2 in the above description. An alternative is to provide a photosensor integrally with the semiconductor laser 3 for the APC, and monitor the amount of the light from the photosensor with the CPU 48.

Meanwhile, the driving section 7 for driving the reader unit 2, as shown in FIG. 8(a), is constituted by a coil section 7a attached integrally to the reader unit 2 and a guiding axis 7b having an axis direction in the principal scanning direction. Inside the coil section 7a is disposed a drive coil 7c (not shown in FIG. 8(a)), which moves the coil section 7a along the guiding axis 7b with the magnetic force generated by the current flow through the drive coil 7c and thereby moves the reader unit 2 along the guiding axis 7b.

Then as shown in FIG. 3, the CPU 48 is connected via the bus 50 and the I/O 54 to the semiconductor laser 3 of the pattern image reader device 100, controlling the turning-on and -off of the semiconductor laser 3. In addition, the CPU 48 is connected to the photosensor 5 via an A/D converter 58, reading the electric signals of the photosensor 5 in digital values in accordance with the amount of the light received by the photosensor 5. In addition, the CPU 48 is connected to the D/A converter 59 for controlling the current flow to the drive coil 7c of the driving section 7, thereby controlling the movement of the reader unit 2.

With the arrangement above, the pattern image reader device 100 can measure the size of the toner image formed on the surface of the transfer and transport belt 26 in the principal scanning direction on the order of microns, as it moves in the principal scanning direction under control by the CPU 48, focuses with the converging lens 6 the laser light emitted by the semiconductor laser 3 on the surface of the transfer and transport belt 26, and receives the reflected light with the photosensor 5.

The CPU 48 is also connected to a variable high voltage source 56 via the I/O 54. The variable high voltage source 56 is to apply voltage to the developing devices 34a to 34d provided to the respective photoreceptor bodies 32a to 32d. Therefore, the CPU 48 can change the density and line width of the formed toner image by changing developing characteristics.

Next, referring to the flow block diagram in FIG. 1 and also to FIGS. 2, 6, 8(a) and 8(b), the image stabilizing process carried out by the present color digital copying machine will be explained in detail.

Here, the dot images $D_{31}$, $D_{63}$, $D_{95}$, $D_{127}$, $D_{159}$, $D_{191}$, $D_{223}$, and $D_{255}$ of eight tones of 31, 63, 95, 127, 159, 191, 223, and 255 shown FIG. 4 are formed next to each other in the auxiliary scanning direction as the image pattern for measurement use. The dot diameters, i.e. the sizes of the dot images D (of an arbitrary tone) in the principal scanning direction, are read by the above-mentioned pattern image reader device 100, and the contents of the lookup tables 45a to 45d are rewritten according to the measurements. The shapes of the dot images $D_{31}$, $D_{63}$, $D_{95}$, $D_{127}$, $D_{159}$, $D_{191}$, $D_{223}$, and $D_{255}$ (the sizes in the principal scanning direction) shown in FIG. 4 represent those with an ideal compensation for gamma characteristics, and the image pattern to the left shown together with the tone numbers illustrates pixels.

Moreover, with the present color digital copying machine, the transfer and transport belt 26 is set to rotate at 100 mm/s and to have the resolution of 400 dpi (dots per inch). Therefore, it takes the dot image D having the size of 1 dot at 400 dpi about 635 µs to pass before the reader unit 2.

Therefore, with the present color digital copying machine, in order to reduce negative effects by the reader unit 2 reading the dot image D diagonally, the reader unit 2 is arranged to move at a speed of 635 mm/s to cover the distance corresponding to 1 dot in about 100 µs in the principal scanning direction.

As for the distance covered by the reader unit 2 in the principal scanning direction, although the resolution is 400 dpi, the beam diameter of the laser light is in fact larger than 1 dot at 400 dpi for forming flat black images, and the dot image actually formed may have a diameter of about 80 µm. Therefore, here, it is arranged so that the amount of the reflected light is read at 10 points while the reader unit 2 moves 100 µm at 635 mm/s.

Therefore, in S13 (will be fully described later), the timer 52 is set to 16 µs, that is the time required to cover 10 µm at 635 mm/s, to generate a break-in signal every 16 µs. The CPU 48 is arranged to read the output value of the photosensor 5 in response to every break-in signal, and to measure the amount of the reflected light at 10 points in all. In addition, the reader unit 2 is arranged to move at the constant speed of 635 mm/s in the principal scanning direction by increasing the set value d with the D/A converter 59 by 10 every 16 µs when the break-in signal is generated.

In the following, operations will be described in detail with the CPU 48 controlling the operations.

At the onset of the image stabilizing process, circuits related to the image processing section including the RGB→YMCK color converter section 43 are turned off (S1).

Next, the image pattern to write the pattern images for measurement use constituted by the eight tone dot images $D_{31}$, $D_{63}$, $D_{95}$, $D_{127}$, $D_{159}$, $D_{191}$, $D_{223}$, and $D_{255}$ is directly written on the respective image memory devices 44a to 44d (S2).

Also, together with the writing of the image pattern on the image memory devices 44a to 44d in S2, the lookup tables 45a to 45d of the above-mentioned colors are set so that the input and output has one-to-one relation, i.e., that the input values from the image memory devices 44a to 44d are outputted to the pulse width modulators 46a to 46d (S3).

Subsequently, the semiconductor laser 3 of the reader unit 2 constituting the pattern image reader device 100 is turned on, and automatic power control is started by the APC 4 (S4). Thereafter, as the stability of the semiconductor laser 3 is confirmed (S5), a set value storing area d of the D/A converter 59 is set to "0" so as to move the reader unit 2 back to its original position (S6). The set value storing area d is provided on the RAM device 53. The actual value setting with the D/A converter 59 is executed in later-mentioned S11.

Subsequently, an image forming system is driven (S7), and the image data of the pattern image for measurement use is read out of the black image memory device 44d, exposure is carried out with the photoreceptor body 32d, and an electrostatic latent image is formed on the photoreceptor body 32d (S8). Next, the electrostatic latent image formed on the photoreceptor body 32d is developed to form the eight dot images $D_{31}$, $D_{63}$, $D_{95}$, $D_{127}$, $D_{159}$, $D_{191}$, $D_{223}$, and $D_{255}$, which are then transferred onto the transfer and transport belt 26 (S10). In an ordinary copying operation, the developed toner image is transferred onto the sheet of paper P on the transfer and transport belt 26. However, in the present operation aiming at correcting the characteristics of the image forming system, the dot image D (of an arbitrary tone) is transferred directly onto the transfer and transport belt 26 to read the dot image D.

Together with the commencement of exposure in S8, the timer 52 is set to the image moving time from the laser exposure position to the position of the reader unit 2, i.e., the time required for the dot image $D_{31}$, first of the eight dot images, to reach the reading position for the reader unit 2 (S9). This allows a break-in signal to be generated at a timing when the first dot image $D_{31}$ is transported to the position opposite the reader unit 2.

Next, the D/A converter 59 is set to "d=0", that is the value of the set value storing area d set in S6 (S11). This brings the reader unit 2 back to the reading starting position. The reading starting position here refers to the position indicated by dotted lines in FIG. 4, a position slightly closer to the originating point of the arrow indicating the principal scanning direction from the starting edge of the dot image D.

Thereafter, as the break-in signal is detected (S12), the timer 52 is set to "16 µs", that is the next reading timing (S13), and the value of the A/D converter 58 for converting the output by the photosensor 5 of the reader unit 2 is read and stored in the RAM device 53 (S14).

Simultaneously, the value of the set value storing area d is set as "d=d+10" (S15), and it is judged whether "d=100" or not (S16). If "d≠100", the process returns to S11, the D/A converter 59 is set to the value of d set in S15, and the operations S11 to S16 are repeated.

It is when the period of time set with the timer 52 in S9 elapses, i.e., when the first dot image $D_{31}$ reaches the position opposite the reader unit 2, that a break-in signal is detected for the first time in S12 and the driving of the reader unit 2 is started. At that moment, the output of the photosensor 5 of the reader unit 2 is read for the first time. Simultaneously with the reading, the reader unit 2 is moved in the principal scanning direction in S15→S16→S11.

While S11 to S16 are repeated, the reader unit 2 is moved 100 µm at 635 mm/s and the output value of the photosensor 5 is read at every time the reader unit 2 is moved about 10 µm. The data is read at 10 points in all and stored in the RAM device 53.

Thereafter, if the reading at the 10 points is completed and "d=100" is detected in S16, the process proceeds to S17, the dot diameter of the first dot image $D_{31}$ is obtained based on the 10 sets of data stored in RAM device 53, and the obtained value is stored in the RAM device 53 in relation to the color (in this case, black) and the tone number (in this case, 31: S17).

Figure 5:
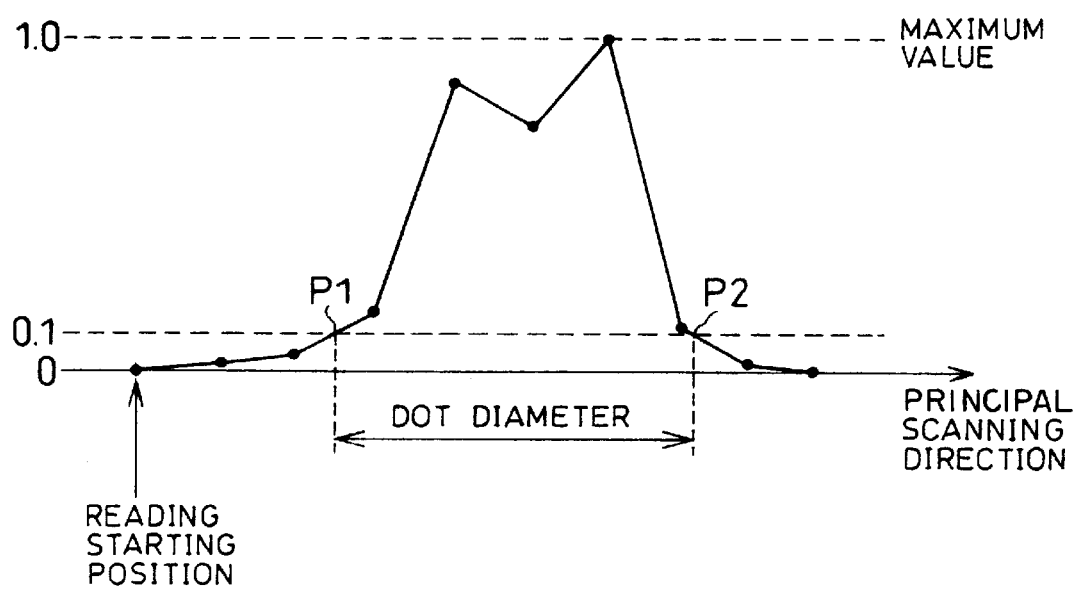
FIG. 5 is an explanatory drawing showing how to obtain the dot diameter from the data read by the pattern image reader device.

The amount of reflected light (toner image density value), i.e., the value read at 10 points obtained by the reader unit 2, typically does not have good distribution due to noise and diffusion of toner upon reading. Therefore, here, the dot diameter is determined, as shown in FIG. 5, as the distance between the points P1 and P2. The points P1 and P2 are the crossing points of the polygonal line linking neighboring points and the horizontal line that corresponds to one-tenth of the maximum read value.

As the diameter of the first dot image $D_{31}$ is obtained in this manner, the diameters of the second to eighth dot images $D_{63}$, $D_{95}$, $D_{127}$, $D_{159}$, $D_{191}$, $D_{223}$, and $D_{255}$ formed on the transfer and transport belt 26 are subsequently obtained in the same manner.

In other words, it is judged whether the measurement of the dot diameter is completed with all the dot images D (S18). If it is determined that the measurement of the dot diameter is not completed with all the dot images D, the process proceeds to S19, and the timer 52 is set to the time corresponding to the distance between the dot images, i.e., the time required for the next dot image D (in this case, $D_{63}$) to reach the reading position for the reader unit 2. This allows a break-in signal to be generated at a timing when the next dot image D is transported to the position opposite the reader unit 2 where the reader unit 2 can read the dot image D.

Subsequently, the set value storing area d of the D/A converter 59 is set to "0" so as to move the reader unit 2 back to the reading starting position (S20), the process returns to S11, and the D/A converter 59 is set to "d=0". This moves the reader unit 2 back to the reading starting position. Thereafter, S19→S20→S11 to S18 are repeated until it is determined in S18 that the measurement of the dot diameter is completed with all the dot images D.

Then if it is detected in S18 that the measurement of the dot diameter is completed with all the dot images D, pattern images for measurement use are formed in the same manner and the dot diameters of all the dot images D are measured as to the remaining colors, i.e. cyan, magenta, and yellow, in this order.

In other words, it is judged whether the measurement of the dot diameters of the eight dot images D is completed with the four colors of yellow, magenta, cyan and black (S21). If it is determined that the measurement is not completed with all the four colors, the process returns to S6, and the operations S6 to S21 are repeated with a next color (in this case, cyan).

Then if it is determined in S21 that the measurement of the dot diameters of the dot images is completed with all the four colors, the set values to the respective lookup tables 45a to 45d are obtained as below (S22), and the lookup tables 45a to 45d of the above-mentioned colors are set (S23). This completes the image stabilizing process.

Although the image patterns of the pattern images for measurement use expanded on the image memory devices 44a to 44d in S2 have all the size of 1 dot as shown in FIG. 4, the image patterns have different image densities among each other, the pulse width modulation varies the ON time of the laser, and consequently the dot diameters of the dot images $D_{31}$, $D_{63}$, $D_{95}$, $D_{127}$, $D_{159}$, $D_{191}$, $D_{223}$, and $D_{255}$ in the principal scanning direction vary.

Here, the measurement of the dot diameter is done with 8 tones of 31, 63, 95, 127, 159, 191, 223, and 255 with respect to the variable range of the image density in 8 bits, i.e. 255 tones from 0 to 255. The measurement establishes the relation between the input values to the pulse width modulators 46a to 46d and the dot diameters in the principal scanning direction for respective colors as shown in the right of FIG. 6.

Figure 6:
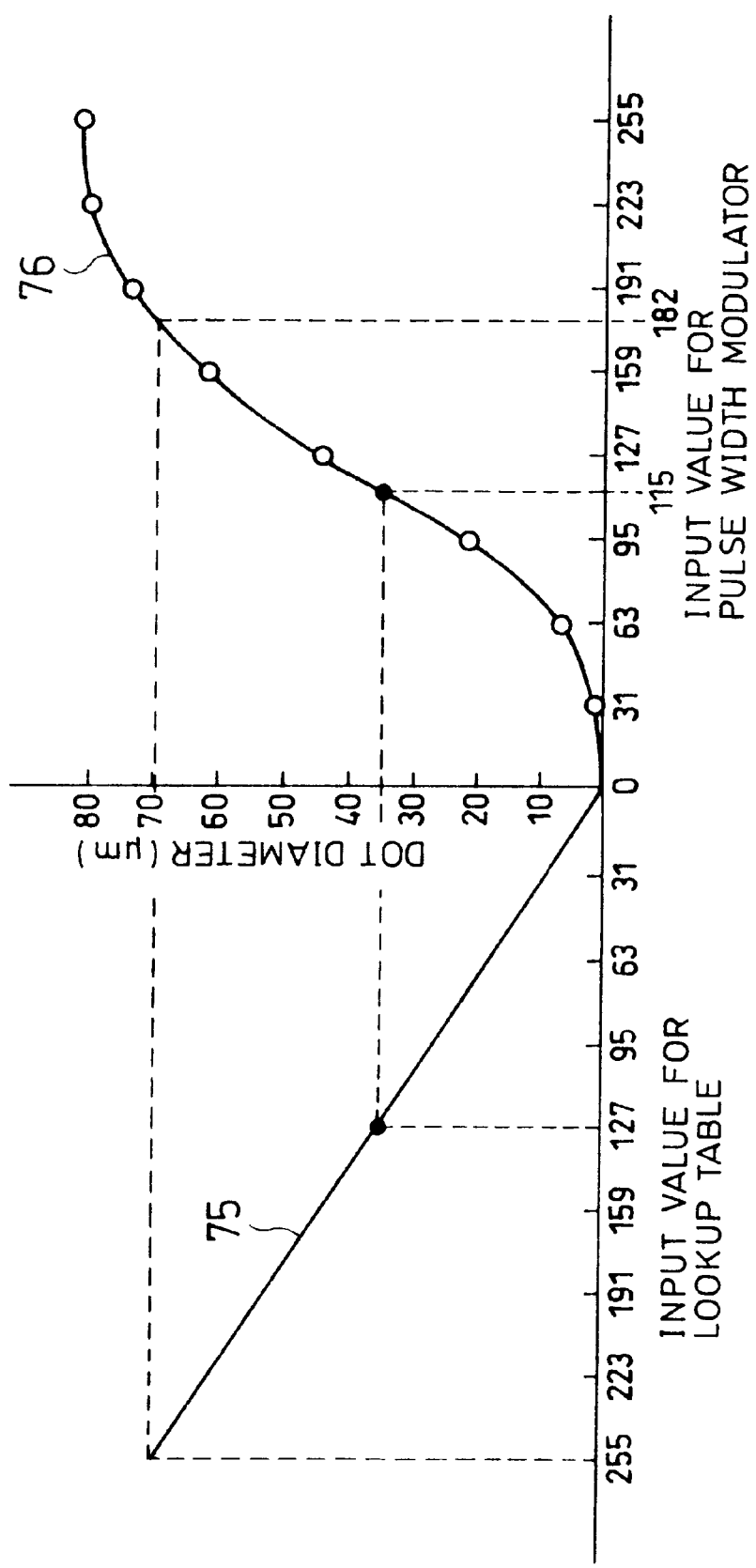
FIG. 6 is an explanatory drawing showing how to obtain set values for a look-up table based on the dot diameters obtained from the data read by the pattern image reader device.

Generally, the relation between the input values to the pulse width modulators 46a to 46d and the accompanying dot diameters is illustrated in the right of FIG. 6 with a certain color being taken as an example, which is not ideal. As a result, the relation between the input values to the pulse width modulators 46 and the final image densities is neither ideal.

Therefore, the CPU 48 change contents of the lookup table 45 so that dot diameters linear to image data are obtained from measured data. To be more specific, as shown in the left-hand side of FIG. 6, input values of 0 to 255 to a lookup table 45 are assumed, and a straight line 75 is assumed so that the dot diameters become 0 to 70 µm to these input values. Then the input values to the pulse width modulator 46 required for desired dot diameters are obtained by referring the straight line 75 to the characteristics 76 actually obtained as shown in the right side of FIG. 6.

More specifically, for example, "115" is obtained as the input value of the pulse width modulator 46 to the input value "127" of the lookup table 45, and "182" is obtained as the input value of the pulse width modulator 46 to the input value 255 of the lookup table 45. The process produces the most appropriate dot diameter in response to image data, and hence the most appropriate image density.

Note that although the ideal magnitude of dot diameters to image data is presumed to be linear, an available alternative is a curved line with various characteristics of the image forming system taken into account. Note also that such an image stabilizing process may be executed, for example, when the main body of the copying machine is powered on and when an image forming process is started after the copying machine is left idle for a certain period of time.

As so far explained, with the color digital copying machine of the present embodiment, the pattern image reader device 100 for reading pattern images for measurement use formed on the transfer and transport belt 26 is constituted by the reader unit 2 that at least contains the semiconductor laser 3, converging lens 6, and photosensor 5 for reading the amount of reflected light and the driving section 7 for moving the reader unit 2 in the principal scanning direction, and can measure on the order of microns the sizes of the toner images formed on the surface of the transfer and transport belt 26 in the principal scanning direction while moving in the principal scanning direction under the control by the CPU 48. Eight tone dot images (toner images of 1 dot) $D_{31}$, $D_{63}$, $D_{95}$, $D_{127}$, $D_{159}$, $D_{191}$, $D_{223}$, and $D_{255}$ are formed using the pattern image reader device 100, and measured for the dot diameters in the principal scanning direction. The image forming conditions are corrected according to the results.

With such a configuration, the present color digital copying machine effecting multiple tone display by varying the sizes of the basic pixels through variations in irradiation time with write-in light can effectively control image forming conditions, effectively execute a process control, and obtain images of good quality.

The present color digital copying machine changes only the contents of the lookup tables 45a to 45d according to the measurements of dot diameters. However, voltages applied to the developing devices 34a to 34d may also be changed together as explained below.

Generally, with digital copying and some other machines, a photoreceptor body charged in advance to a predetermined potential is exposed. Toner sticks to parts of the photoreceptor body where the potential becomes lower due to differences with the voltage applied to the developing device. The distribution of the amount of laser beam used for exposure typically complies with Gaussian distribution, causing an electrostatic latent image formed to have an increasingly higher potential towards the edge of the dot from the center. Therefore, a change in the voltage applied to the developing device results in a change in the dot diameter of the toner image formed.

In FIG. 6, the input value of about "180" to the pulse width modulator 46 results in the dot diameter as large as 70 µm, and input values exceeding "180" will not be used. So, if the voltage applied to the developing device 34 is lowered, the dot diameters formed in response to the input values to the pulse width modulator 46 are all reduced, and input values larger than "180" result in dot diameters of less than 70 µm.

Figure 7:
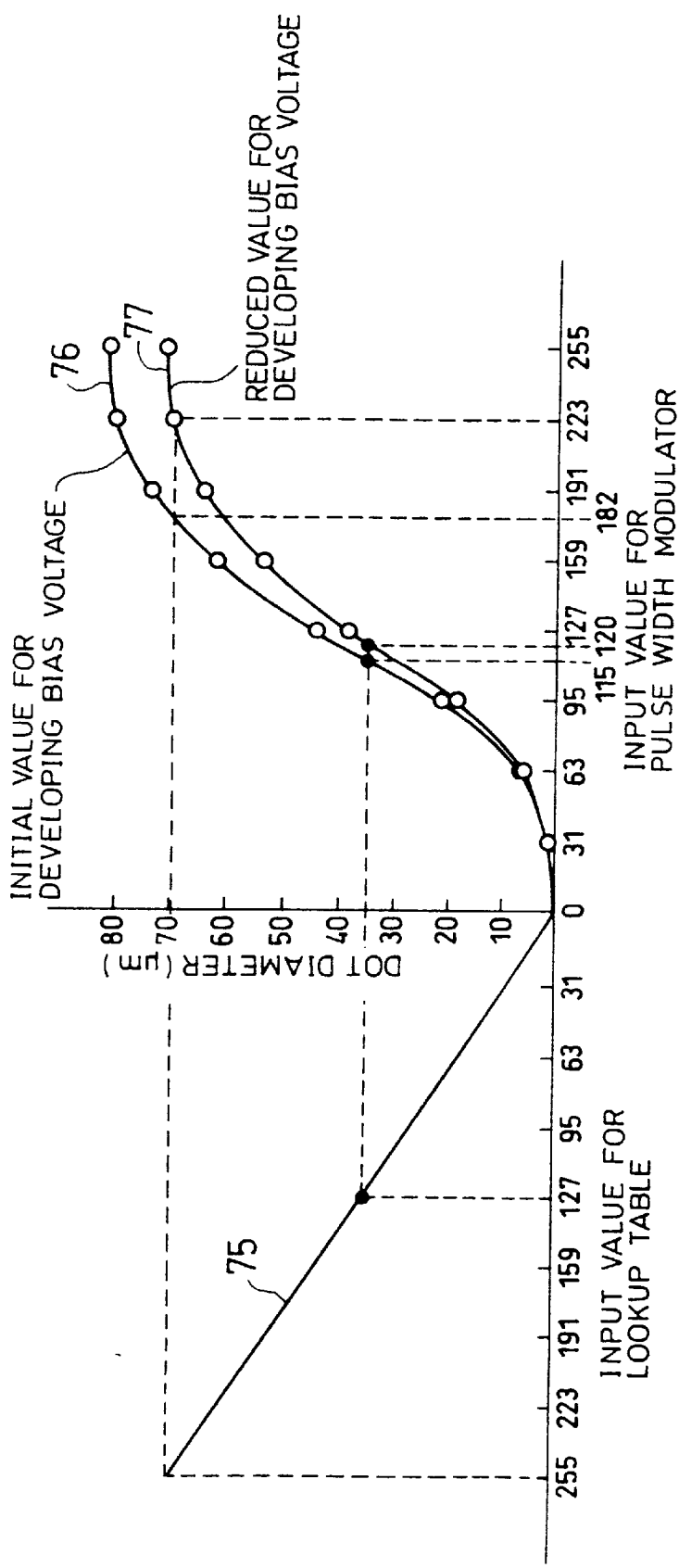
FIG. 7 is an explanatory drawing showing how to obtain set values for a look-up table based on the dot diameters obtained from the data read by the pattern image reader device when a reduced voltage is applied to the developing device.

FIG. 7 illustrates how the characteristics 76 in FIG. 6 changes when the voltage applied to the developing device 34 is lowered. This process may be employed on top of changes in the contents of the lookup table 45.

The pattern image reader device 100 is arranged to move the reader unit 2. The same measurement of the size of the pattern on the order of 10 µm can be realized by fixing the reader unit 2 and moving the pattern to be read.

Moreover, the same process as above can be successfully applied to the measurement of, not only the size of the pattern, but also the distance from the reference position in the moving direction by carrying out the reading with the reader unit 2 while moving either the reader unit 2 or the pattern.

For example, when a color image is formed by overlapping toner images of different colors with, for example, a color copying machine, if the toner images are not formed in the right positions for overlapping, the colors do not overlap properly to reproduce the correct image.

A conventional image forming process to solve this problem is to, for example, form line-like pattern images for measurement use on the transfer and transport belt 26 with respect to yellow, magenta, cyan, and black colors, measure the distance between lines to judge whether the lines are formed at the predetermined distance from each other, and thus control the exposure timing so as to compensate for the displacement. However, the pattern image reader device 100 above in accordance with the present invention may be suitably used for such a compensation to detect the distance between lines with high precision and calculate the displacement accurately, allowing more effective process control and producing good images with colors properly overlapping on one another.

[Second Embodiment]

Referring to FIGS. 9 through 12, the following description will discuss the second embodiment in accordance with the present invention. Here, for convenience, members of the present embodiment that have the same arrangement and function as members of the previous embodiment, and that are mentioned in the previous embodiment are indicated by the same reference numerals and description thereof is omitted.

When the size of the dot image D is to be obtained, for example, as with the pattern image reader device 100 of the first embodiment explained above, from the results of sampling outputs by the reader unit 2 every predetermined period of time and the distance by which the reader unit 2 moves during that period of time, if the reader unit 2 does not move at a constant speed, it becomes difficult to measure the distance covered during the predetermined period of time precisely, and thus to measure the size of the dot image D precisely. This adds to requirements on the capability of the driving section 7 and inevitably leads to higher costs.

Therefore, the present embodiment is configured so that the position of the reader unit 2 is detected during the movement, and the CPU 48 controls the timing of sampling the outputs by the reader unit 2 according to the results of the detection. With the configuration, the precise size of the dot image can be obtained by precisely recognizing the sampling (reading) position regardless of inconsistency in the speed of the reader unit 2.

Figure 9:
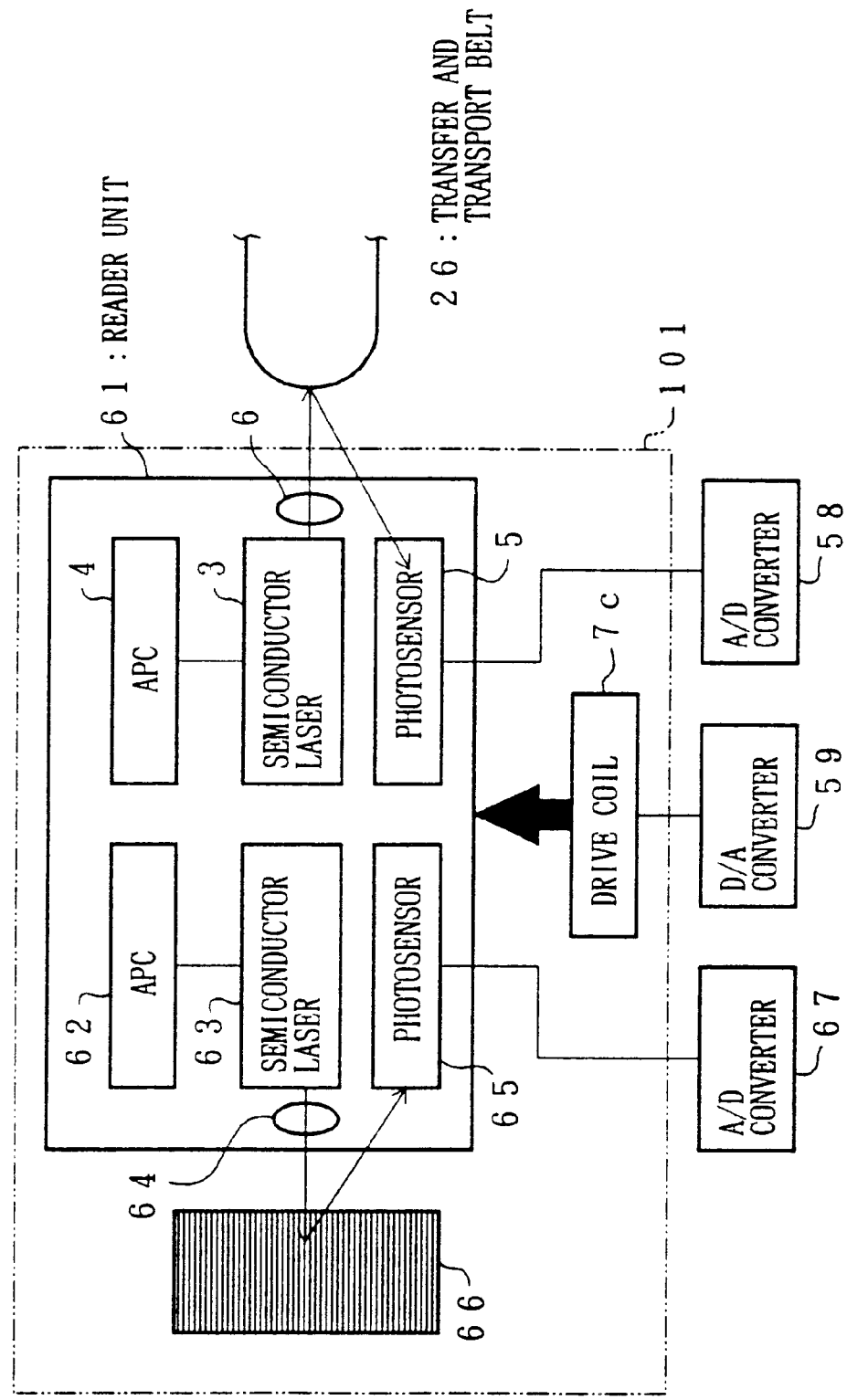
FIG. 9 is a block diagram showing a configuration of a pattern image reader device for reading pattern images for measurement use, which is another embodiment of the image stabilizer device in accordance with the present invention.
Figure 10:
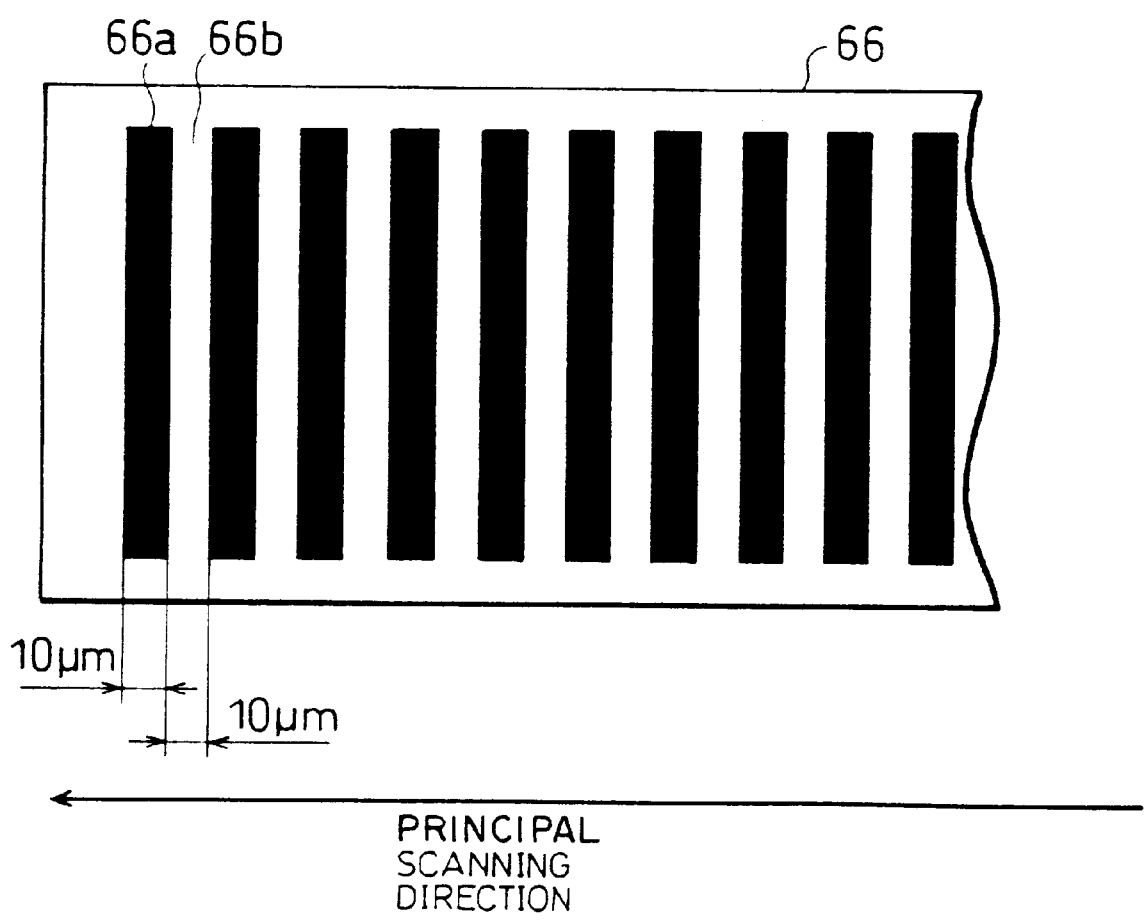
FIG. 10 is a plan view showing a position reference plate incorporated in the pattern image reader device shown in FIG. 9.
Figure 11:
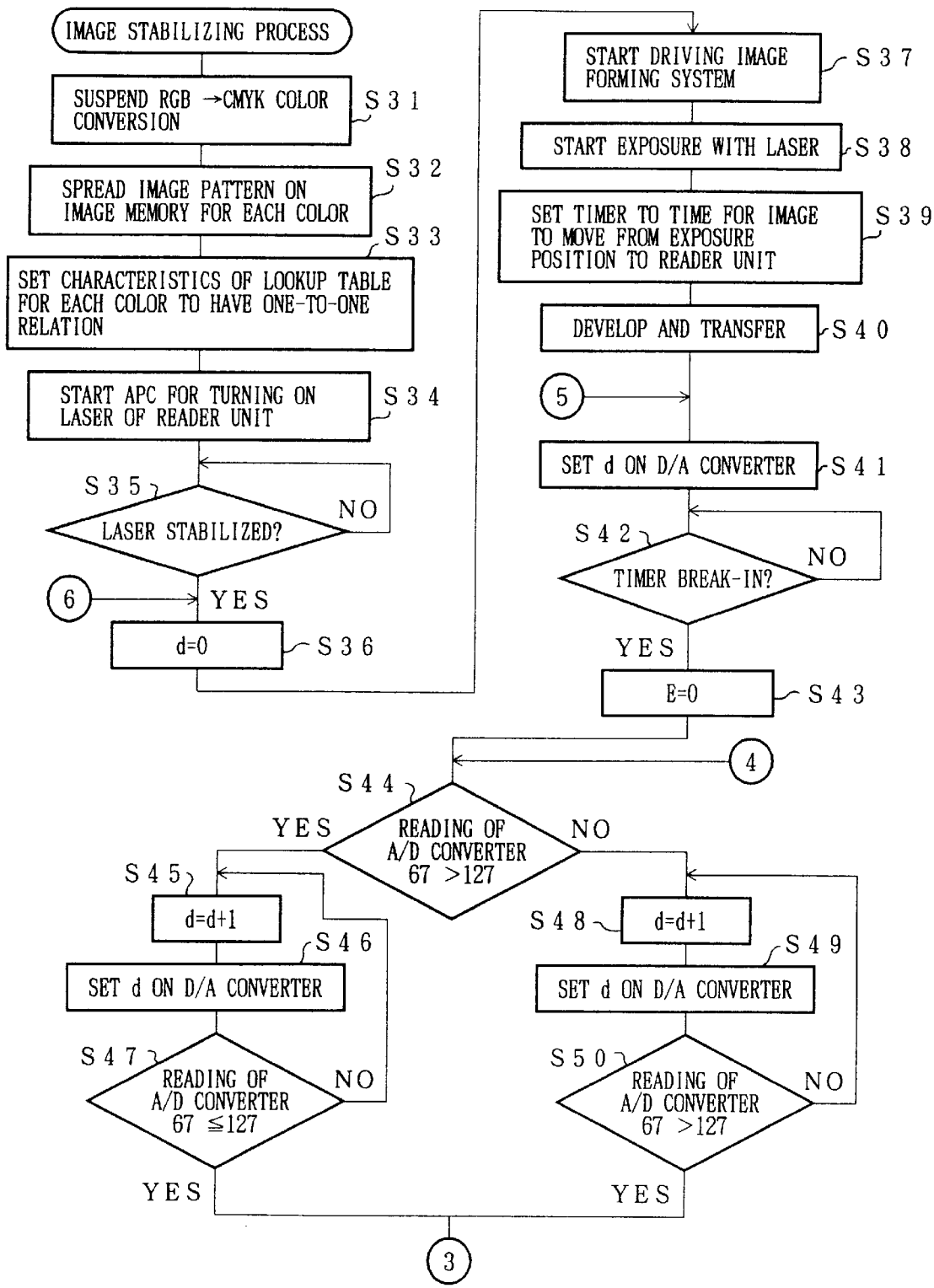
FIG. 11 is a flow block diagram showing operations by the embodiment incorporating the pattern image reader device shown in FIG. 9 in an image stabilizing process.
Figure 12:
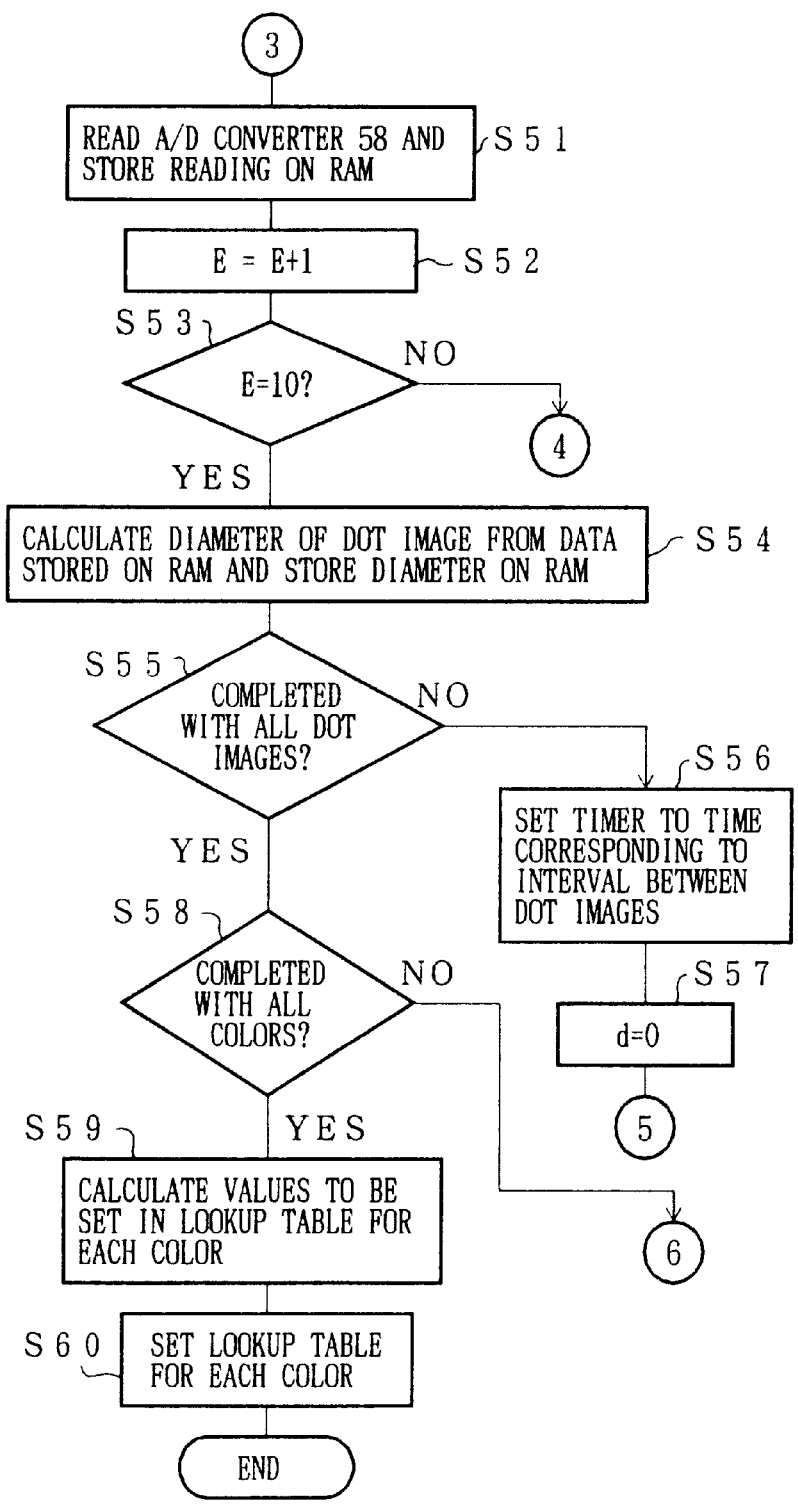
FIG. 12 is a flow block diagram showing subsequent operations to those shown in FIG. 12.

FIG. 9 is a block diagram showing a configuration of a pattern image reader device 101 incorporated in a color digital copying machine as an image forming apparatus of the present embodiment. The color digital copying machine of the present embodiment is virtually the same as that of the first embodiment, differing only in the configuration of the pattern image reader device 101.

The pattern image reader device 101 is a pattern image reader device 100 shown in FIG. 8, plus a position reference plate (position reference pattern) 66 having a black & white zebra pattern; a reader unit 61 including a semiconductor laser 63, a converging lens 64, and a photosensor 65 for reading the zebra pattern of the position reference plate 66; and an APC 62 for controlling the amount of light emitted by the semiconductor laser 63. Hereinafter, the semiconductor laser 3, the photosensor 5, etc. for reading the pattern image for measurement use formed on the transfer and transport belt 26 will be referred to as the first reader section, whereas the semiconductor laser 63, the photosensor 65, etc. for reading the zebra pattern of the position reference plate 66 will be referred to as the second reader section, so as to distinguish the former from the latter. The position detection means is constituted by the position reference plate 66 and the second reader section.

The position reference plate 66 is provided according to the position of the pattern image for measurement use formed on the transfer and transport belt 26. The white areas 66b and black areas 66a of the zebra pattern of the position reference plate 66 are 10 $\mu$m wide each in accordance with the reading interval in the first embodiment.

The movement of the reader unit 61 in the principal scanning direction is driven by a driving section 7 including a drive coil 7c in the same manner as the reader unit 2. Simultaneously the second reader section reads the zebra pattern of the position reference plate 66, and signals generated by the photosensor 65 in accordance with the amount of reflected light are coupled to the input of an A/D converter 67. The A/D converter 67, similarly to the A/D converter 58, is connected to the CPU 48 via a bus 50 (see FIG. 3). The CPU 48 thereby can read the zebra pattern of the position reference plate 66.

In the following, an image stabilizing process by the present color digital copying machine will be described in detail with the CPU 48 controlling the process in reference to the flow block diagrams in FIGS. 11 and 12, and FIGS. 9 and 10.

Figure 1:
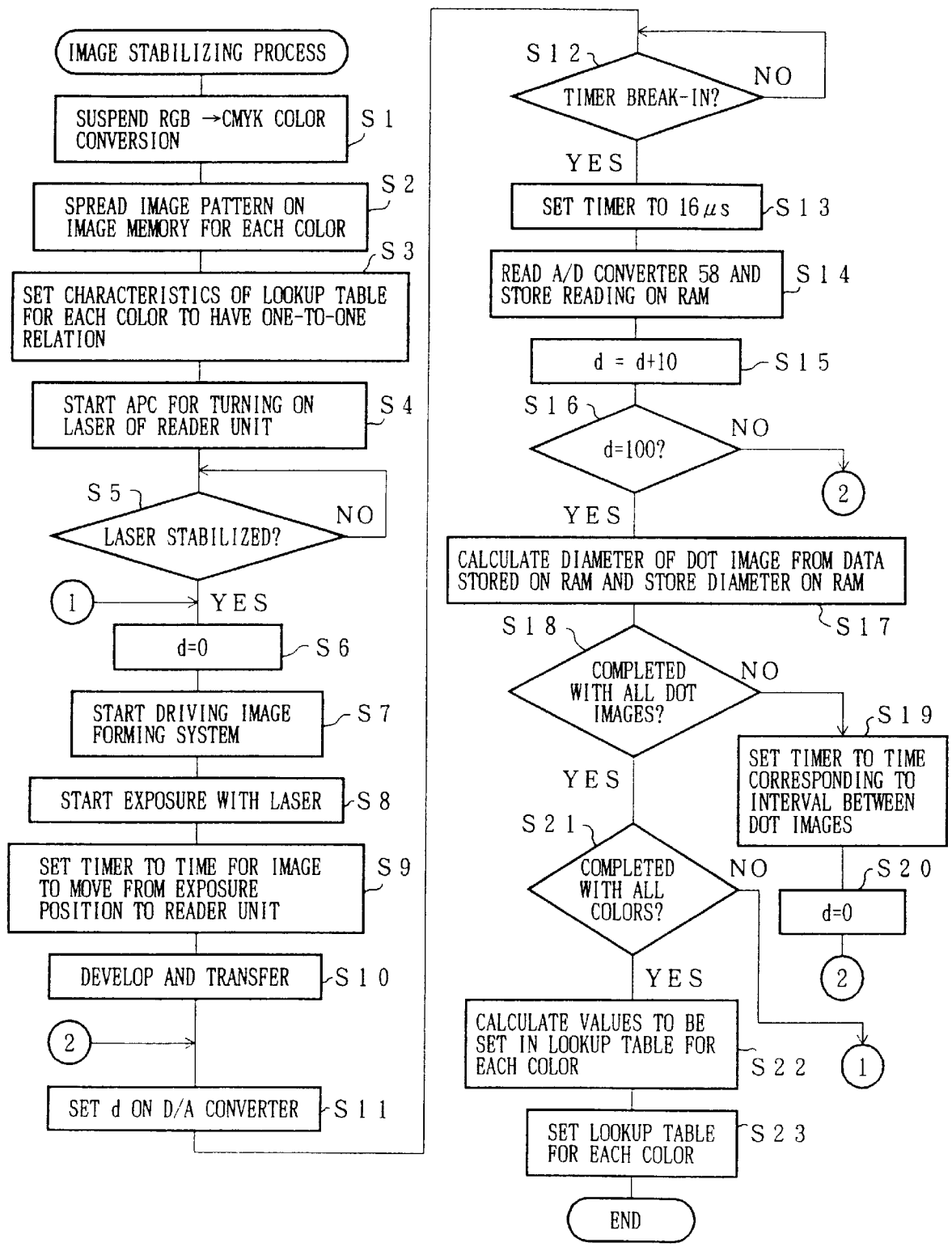
FIG. 1 is a flow block diagram showing operations by an embodiment of the image stabilizer device in accordance with the present invention in an image stabilizing process.

At the onset of the image stabilizing process, operations S31 to S42 are executed, which are the same as the operations S1 to S12 in the flow block diagram in FIG. 1. Consequently, a break-in signal is generated when $D_{31}$, the first dot (see FIG. 4), reaches the position opposite the first reader section of the reader unit 61.

As the generation of a break-in signal is detected (S42), a reading history storing area E for counting measurement points is initialized and set to 0 in reference to the position reference plate 66 (S43). The reading history storing area E is provided on a RAM device 53.

Subsequently, it is judged whether the second reader section 2 of the reader unit 61 is currently reading a white area 66b or a black area 66a of the zebra pattern of the position reference plate 66, depending on whether or not the A/D converter 67 whose input is coupled with the output of the photosensor 65 of the second reader section measures over "127 (one half of 8 bits)" (S44).

If the A/D converter 67 measures over 128 or greater in S44, i.e., if a white area 66b is currently being read, the set value d of the D/A converter 59 is increased and the current flow to the drive coil 7c is increased until it is determined in S47 that the A/D converter 67 measures less than 128, i.e., a black area 66a has been reached (S45, S46). The reader unit 61 moves little by little and reaches the border between the white area 66b and the black area 66a of the zebra pattern of the position reference plate 66 by executing S45 to S47 repeatedly and thus increasing the set value with the D/A converter 59.

By contrast, if the A/D converter 67 measures less than 128 in S44, i.e., if a black area 66a is currently being read, the set value to the D/A converter 59 is increased until it is determined in S50 that the A/D converter 67 measures 128 or greater, i.e., a white area 66b has been reached (S48, S49). The reader unit 61 moves little by little and reaches the border between the white area 66b and the black area 66a of the zebra pattern of the position reference plate 66 by executing S48 to S50 repeatedly and thus increasing the set value with the D/A converter 59.

As the border between the white area 66b and the black area 66a of the zebra pattern of the position reference plate 66 is detected, the measurement by the A/D converter 58 connected to the photosensor 5 of the first reader section that reads the first dot image $D_{31}$ on the transfer and transport belt 26 is read and stored in the RAM device 53 (S51).

Subsequently, the value of the reading history storing area E is counted up (S52). Thereafter, the operations S44 to S53 are repeated until ten readings are completed and it is determined in S53 that "E=10". The readings at 10 points are done in this manner.

If it is determined in S53 that "E=10", the process proceeds to S54. Then, S54 to S60, that are the same operations as S17 to S23 in the flow block diagram in FIG. 1, are executed to change the set values with the lookup tables 45a to 45d.

However, if it is determined in S55 that the measurement of the dot diameter is yet to be completed with all the dot images, the process proceeds to S56. The timer 52 is set to the time corresponding to the distance between the dot images, i.e., the time required for the next dot image D (in this case, $D_{63}$) to reach the reading position for the first reader section of the reader unit 61, and the set value storing area d of the D/A converter 59 is set to "0" to move the reader unit 61 back to the reading starting position (S57). The process then returns to S41. Thereafter, S56→S57→S41 to S55 are repeated until it is determined in S55 that the measurement of the dot diameter is completed with all the dot images D.

If it is determined in S58 that the measurement of the dot diameter is yet to be completed with all the colors, the process proceeds to S36, and the operations S36 to S58 are repeated.

The color digital copying machine of the present embodiment is advantageous over that of the first embodiment in that precise reading can be done even with low precision of a drive coil 7c of a driving section 7 of the pattern image reader device 101, because a position reference plate 66 is provided, and the reading of image pattern for measurement use is done while the position reference plate 66 is being read by a second reader section provided inside the reader unit 61 integrally with the first reader section.

[Third Embodiment]

Referring to FIGS. 13 through 16, the following description will discuss the third embodiment in accordance with the present invention. Here, for convenience, members of the present embodiment that have the same arrangement and function as members of the previous embodiments, and that are mentioned in the previous embodiments are indicated by the same reference numerals and description thereof is omitted.

Typically, laser beams are used to write electrostatic latent images. However, the laser beam produces an elliptic spot, resulting in a dot image that is also close to an ellipse. Therefore, in order to read the size of a dot image D for measurement use while moving the reader unit 2 in the principal scanning direction, the reader unit 2 needs be moved to read the central part of the dot image D.

However, since the distance between the position where the reader unit 2 is disposed and the image forming position where the dot image D is formed varies, even if the reader unit 2 is driven in a predetermined period of time after the writing of the image pattern, the reader unit 2 does not necessarily passes over the dot image D at the most suitable timing. If the reader unit 2 reads the dot image D off the center in the auxiliary scanning direction, the reading becomes smaller than the real dot diameter, obstructing precise correction.

A method to avert this is to form a straight line extending in the auxiliary scanning direction and read its line width. However, when a straight line is formed in the auxiliary scanning direction, the timing when the write-in light is turned on contains jitter, and there is a possibility for the reader unit 2 to detect even the narrowing down of the line caused by the jitter.

Therefore, in the present embodiment, when the dot image D is formed, a timing pattern image is formed together for determining the timing to start the reading of the dot image D. Then the CPU 48 controls the movement starting timing for moving the reader unit 2 according to the detection of the timing pattern image by the reader unit 2. Details follow.

The color digital copying machine of the present embodiment includes the same pattern image reader device 100 as that of the first embodiment. The difference lies in a control program for an image stabilizing process stored in the ROM device 51, or to be more specific, in the procedures for measuring the diameter of the dot image with the pattern image reader device 100.

Figure 13:
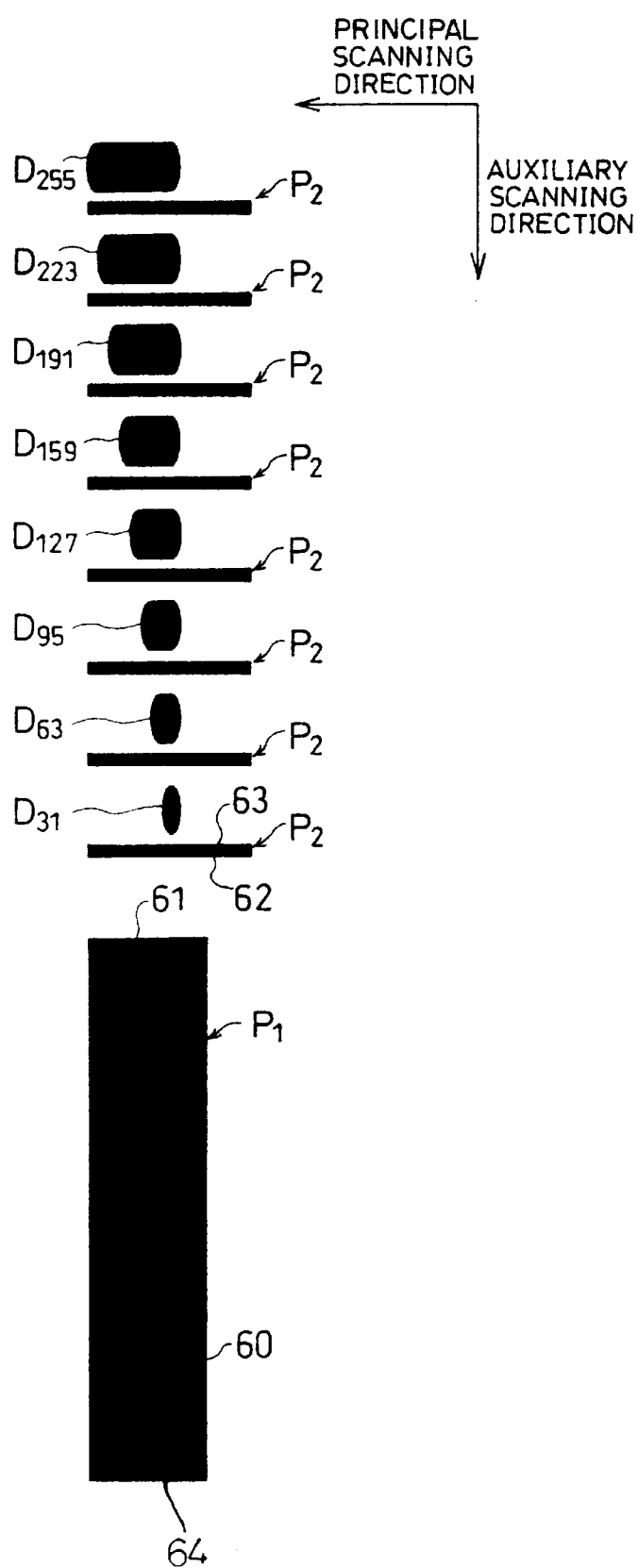
FIG. 13 is an explanatory drawing showing image patterns of pattern images for measurement use employed in an image stabilizing process, which is another embodiment of the image stabilizer device in accordance with the present invention.

Here, pattern images for measurement use as in FIG. 13 are formed on the transfer and transport belt 26, where eight linear pattern images (pattern images for timing) $P_2$ extending in the principal scanning direction are arranged so as to be detected by the reader unit 2 of the pattern image reader device 100 before the respective dot images $D_{31}$, $D_{63}$, $D_{95}$, $D_{127}$, $D_{159}$, $D_{191}$, $D_{223}$, and $D_{255}$ for measuring the dot diameters are detected. In addition, a rectangular, flat color pattern image (pattern image for timing) $P_1$ is arranged to extend in the auxiliary scanning direction before the first dot image $D_{31}$ and its linear pattern image $P_2$.

The dot images $D_{31}$, $D_{63}$, $D_{95}$, $D_{127}$, $D_{159}$, $D_{191}$, $D_{223}$, and $D_{255}$ for measurement use are arranged in the same manner as those shown in FIG. 4 of the first embodiment. The rectangular, flat color pattern image $P_1$ is 20 mm long in the auxiliary scanning direction.

Figure 14:
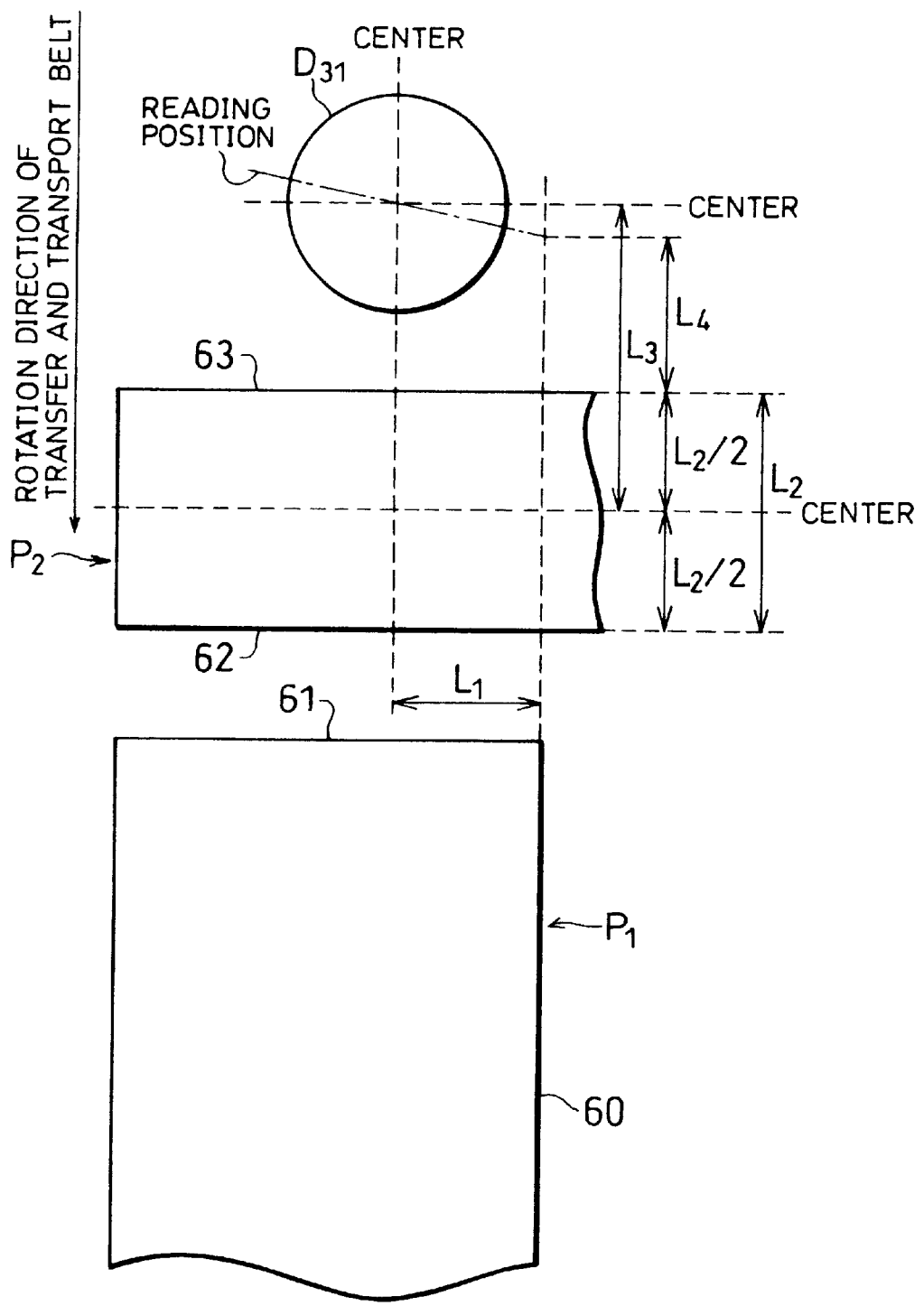
FIG. 14 is an explanatory, enlarged drawing showing relative positions of the patterns of the image patterns shown in FIG. 13.

Taking the first dot image $D_{31}$ as an example, FIG. 14 shows relative positions of the first dot image $D_{31}$, the linear pattern image $P_2$, and the rectangular, flat color pattern image $P_1$. As shown in FIG. 14, the center of the linear pattern image $P_2$, which extends in the principal scanning direction, is distanced from the first dot image $D_{31}$, which follows the linear pattern image $P_2$, by a predetermined distance $L_3$ in the auxiliary scanning direction. A right-hand edge 60 of the rectangular, flat color pattern image $P_1$ is distanced from the center of the first dot image $D_{31}$ by a predetermined distance $L_1$ in the principal scanning direction.

Figure 15:
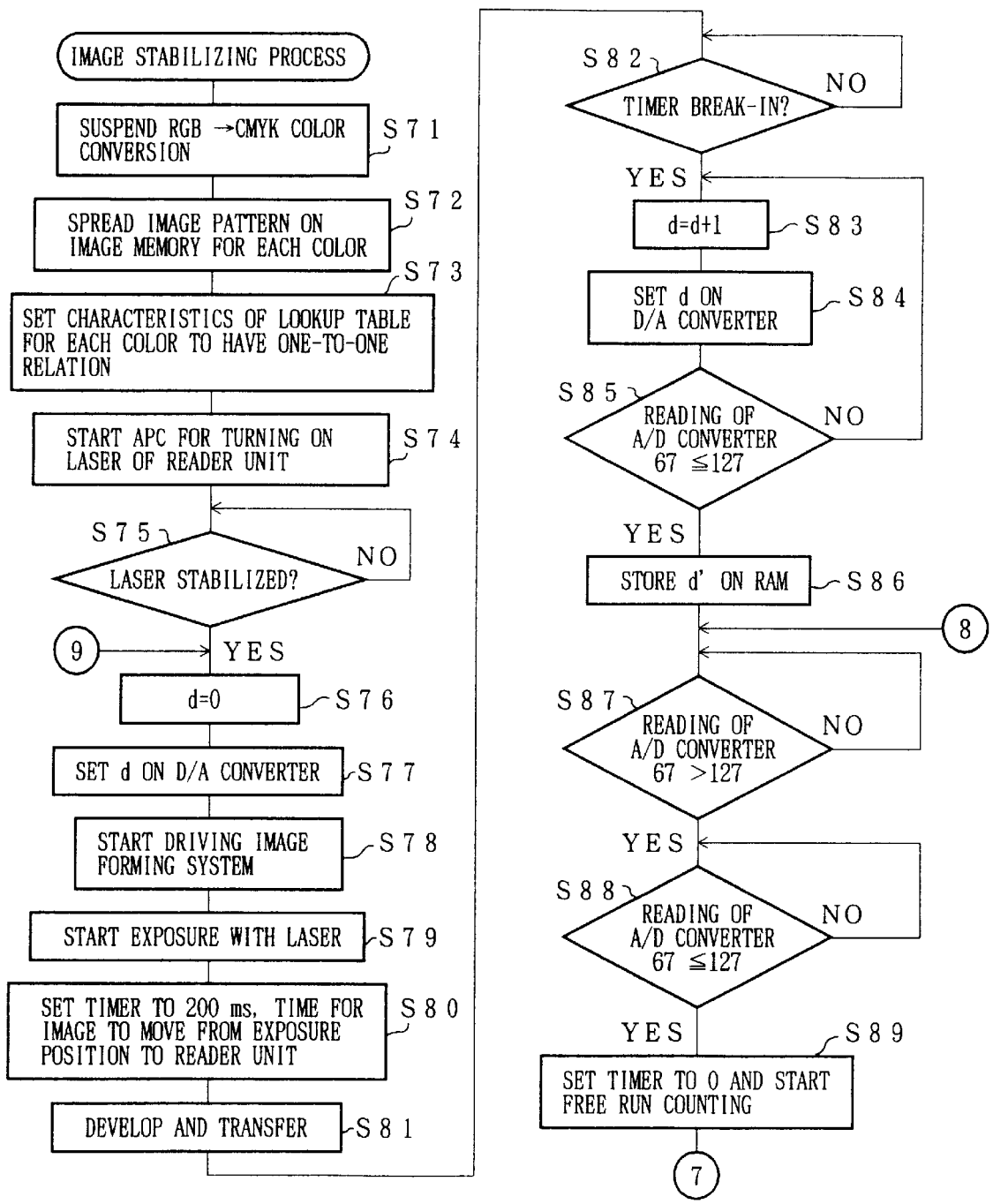
FIG. 15 is a flow block diagram showing operations by the embodiment employing the pattern images for measurement use shown in FIG. 13 in an image stabilizing process.
Figure 16:
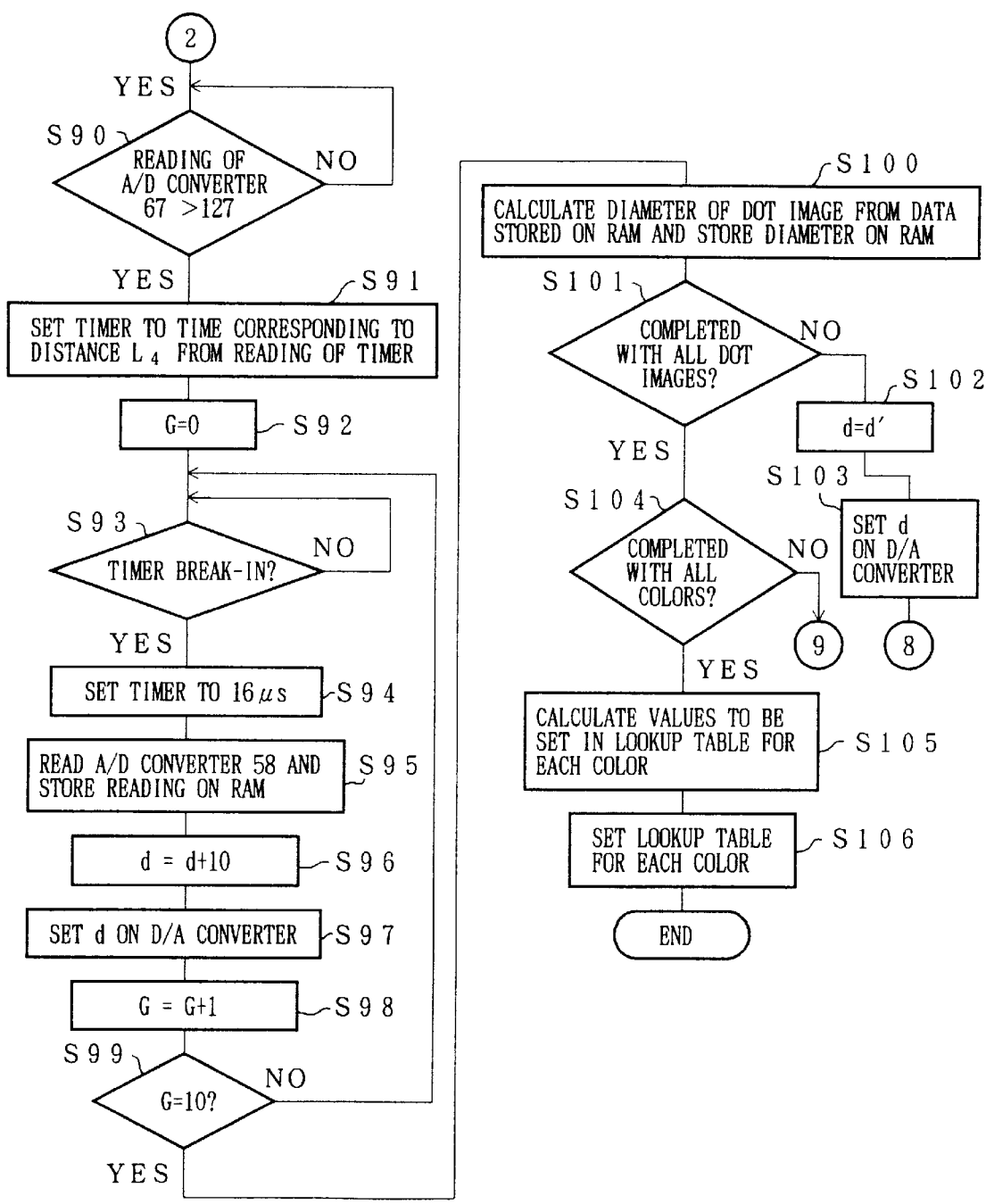
FIG. 16 is a flow block diagram showing subsequent operations to those shown in FIG. 15.

Referring to the flow block diagrams in FIGS. 15 and 16, as well as to FIGS. 13 and 14, the following description will explain an image stabilizing process by the present color digital copying machine.

At the onset of the image stabilizing process, operations S71 to S75 are executed, which are the same as the operations S1 to S5 in the flow block diagram in FIG. 1.

Then as the stability of the semiconductor laser 3 of the reader unit 2 is confirmed in S75, the D/A converter 59 is set to "d=0" to move the reader unit 2 back to the reading starting position (S76 and S77). However, the reading starting position here is different from that explained in the first embodiment, being set to be further right to the right-hand edge 60 of the rectangular, flat color pattern image $P_1$ shown in FIG. 13 and always in a non toner image forming area. Hereinafter, the reading starting position when d=0 will be referred to as the zero position, whereas the later-mentioned reading starting position where the measurement of the dot images D at 10 points is started will be referred to as the reading starting position.

Next, operations S78 to S82 are executed, which are the same as the operations S7 to S10 in the flow block diagram in FIG. 1. However, the timer value to which the timer 52 is set in S80 is 200 ms shorter than the timer value set in S9 shown in the flow block diagram in FIG. 1.

This is determined for the following reasons; The rectangular, flat color pattern image $P_1$ shown in FIG. 13 measures 20 mm in length in the auxiliary scanning direction; the distance between the first dot image $D_{31}$ and a trailing edge 61 of the rectangular, flat color pattern image $P_1$ is shorter than 20 mm; and the transfer and transport belt 26 is driven to rotate at 100 mm/s.

This allows the first break-in signal detected in S82 to be generated right after a leading edge 64 of the rectangular, flat color pattern image $P_1$ passes the position opposite the reader unit 2.

As the break-in signal is detected in S82, the set value d of the D/A converter 59 is increased in a gradual, stepped manner (S83 and S84). Then, as it is detected in S85 that the value of the A/D converter 58 coupled to the photosensor 5 of the reader unit 2 is equal to or below "127", that is, the reflected light from the transfer and transport belt 26 is scattered by the rectangular, flat color pattern image $P_1$, and thus becomes weaker, that position is treated as that of the right-hand edge 60 of the rectangular, flat color pattern image $P_1$, and a value d' for moving the reader unit 2 back to the position is saved on the RAM device 53 (S86). This position acts as the reading starting position.

If it is determined at this position that the value of the A/D converter 58 is greater than 127 and that the reader unit 2 is no longer over the rectangular, flat color pattern image $P_1$ (S87), a leading edge 62 of the linear pattern image $P_2$ formed adjacent to the first dot image $D_{31}$ is detected (S88), and the timer 52 is started as a free run counter (S89).

Next, when a trailing edge 63 of the linear pattern image $P_2$ is detected (S90), the value of the timer 52 is read, and the timer 52 is set to the time equivalent to the distance shown in FIG. 14 (S91).

In other words, the distance between the center of the first dot image $D_{31}$ and that of the linear pattern image $P_2$ shown in FIG. 14 is determined in advance, while the width of the linear pattern image $P_2$ varies depending upon image forming and other conditions. Therefore, the time that it really takes for the center of the first dot image $D_{31}$ to pass the position opposite the reader unit 2 is precisely determined by obtaining the width by way of the detection of the leading and trailing edges 62 and 63 of the linear pattern image $P_2$ and subtracting half the value of the timer 52 from the center-to-center distance $L_3$ between the dot image D and the linear pattern image $P_2$.

However, since the reading takes some time, the timer 52 is set to a time equivalent to $L_4$ shown in FIG. 14 by taking into consideration the requisite reading time obtained in advance (e.g. 100 $\mu$m in the first embodiment).

The timer 52 is set to a certain value in S91, a reading history storing area G is initialized (S92), the reading of the first dot image $D_{31}$ is started upon the generation of a break-in signal, and the dot diameter is read by breaking in every 16 $\mu$s similarly to the first embodiment (S93 to S99).

That is, the reading at 10 points is done by moving the drive coil 7c by 10 steps at a time similarly to the first embodiment (S96 and S97), and increasing the reading history storing area G in a gradual, stepped manner (S98).

Thereafter, if it is determined in S99 that "G=10", the process proceeds to S100, and the same operation as S17 in the flow block diagram in FIG. 1 is carried out to obtain the dot diameter and save on the RAM device 53.

Thereafter, it is judged in S101 if the measurement of the dot diameter is completed with all the dot images D. If it is determined that the measurement is yet to be completed with all the dot images D, the process proceeds to S102, and the set value storing area d is set to "d" that was stored in S86, and this is set with the D/A converter 59 (S103). The reader unit 2 moves back again to the reading starting position that is the position of the right-hand edge 60 of the rectangular, flat color pattern image $P_1$ in this manner.

The operations S102→S103→S17 to S101 are repeated until it is determined in S101 that the measurement of the dot diameter is completed with all the dot images D.

Thereafter, if it is determined in S101 that the measurement of the dot diameter is completed with all the dot images D, the process proceeds to S104, and S104 to S106, which are the same operations as S21 to S23 in the flow block diagram in FIG. 1, are executed to change set values in the lookup tables 45a to 45d.

However, here, if it is determined that the measurement is yet to be completed with all the colors, the process proceeds to S76, and the operations S76 to S104 are repeated.

According to the present embodiment, the position of the reader unit 2 in the principal scanning direction is adjusted precisely to the dot image D, using the right-hand edge 60 of the rectangular, flat color pattern image $P_1$ in advance, and the position thereof in the auxiliary scanning direction is adjusted, using the edges 62 and 63 of the linear pattern image $P_2$ formed prior to the dot image D. Therefore, the center of the dot image D can be read precisely without adjustment in regard of parts and components of the color digital copying machine attached in an inappropriate manner.

[Fourth Embodiment]

Figure 17:
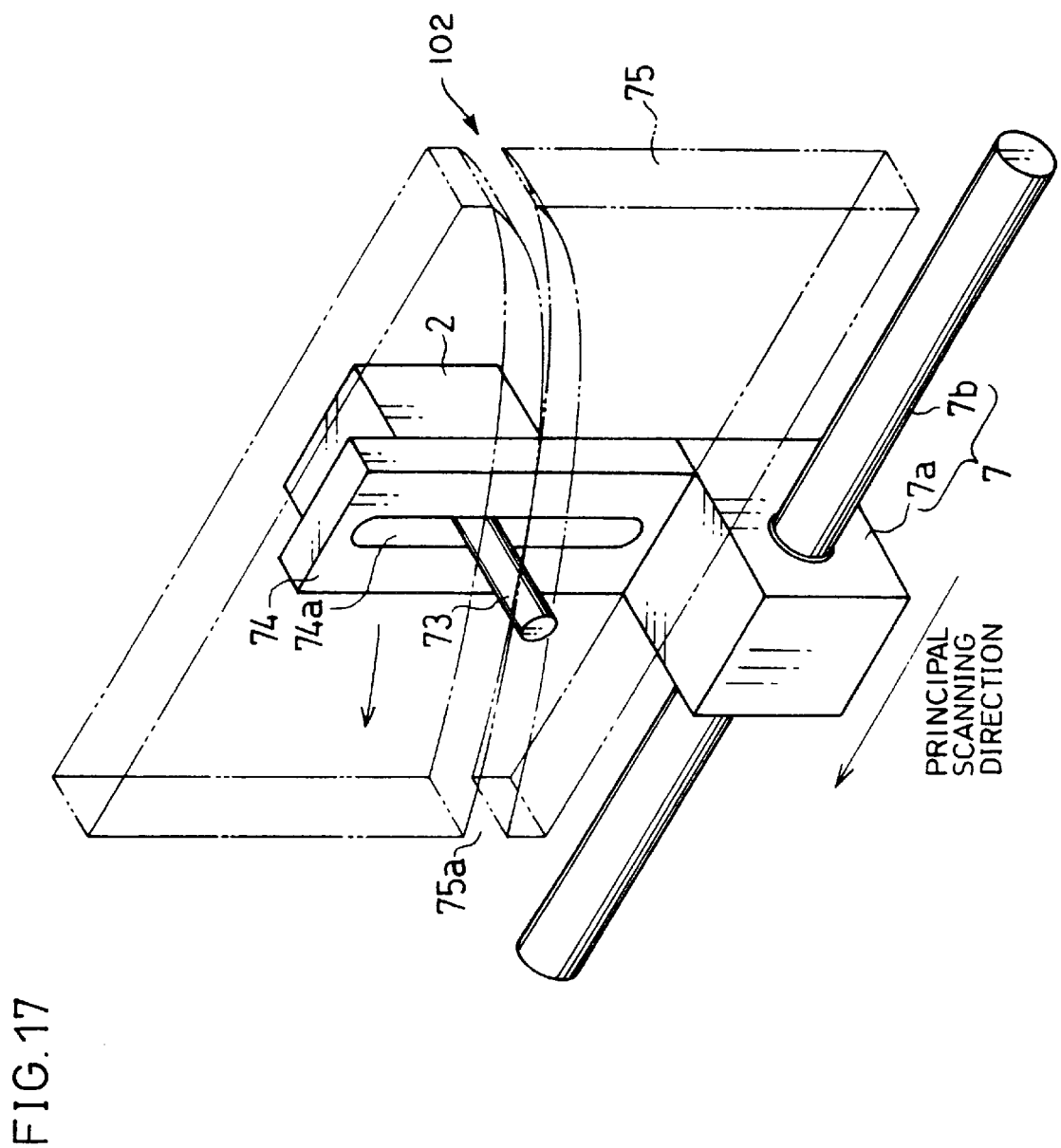
FIG. 17 is a perspective view showing a configuration of a pattern image reader device for reading pattern images for measurement use, which is a fourth embodiment of the image stabilizer device in accordance with the present invention.
Figure 18:
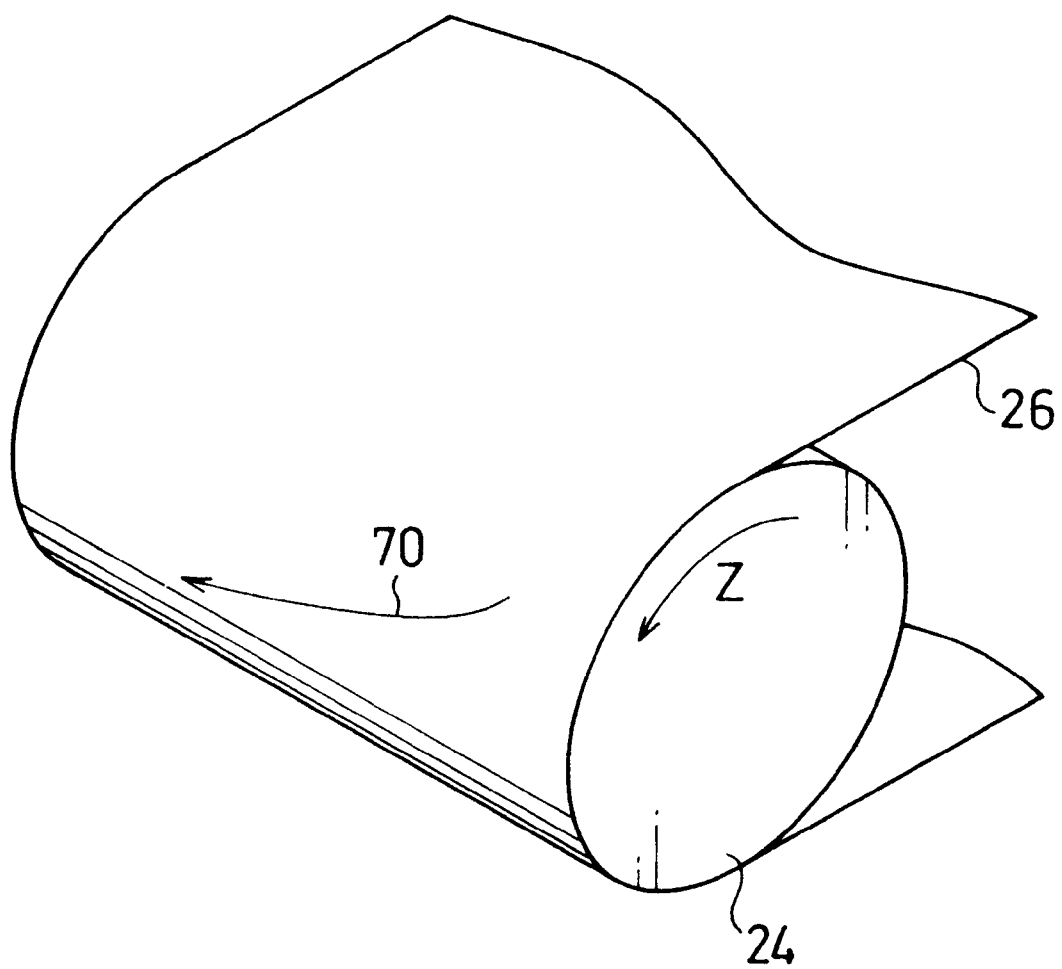
FIG. 18 is an explanatory drawing schematically showing a track of scanning by the reading unit when the transfer and transport belt is scanned by the pattern image reader device shown in FIG. 17.

Referring to FIGS. 17 and 18, the following description will discuss the fourth embodiment in accordance with the present invention. Here, for convenience, members of the present embodiment that have the same arrangement and function as members of the previous embodiments, and that are mentioned in the previous embodiments are indicated by the same reference numerals and description thereof is omitted.

If the reader unit 2 of the driving section 7 is not moved fast enough compared to the movement of the transfer and transport belt 26, the reading track is diagonal and it becomes impossible to determine the speed exactly. The driving section 7 needs be more powerful to move the reader unit 2 at high speed. As the speed becomes faster, more time and distance are essential for the acceleration, which requires even more powerful capability to the driving section 7.

Bearing the above problem in mind, the present embodiment is configured so that the reader unit 2 moves in the auxiliary scanning direction almost as fast as the transfer and transport belt 26 on which the dot images D (see FIG. 4) are formed.

FIG. 17 shows a configuration of a pattern image reader device 102 incorporated in the color digital copying machine of the present embodiment.

The pattern image reader device 102 differs from the pattern image reader device 100 of the first embodiment shown in FIG. 8 in that the reader unit 2 of the pattern image reader device 102 is configured to move in the auxiliary scanning direction as well as in the principal scanning direction.

Like the pattern image reader device 100, the reader unit 2 of the pattern image reader device 102 moves together with the coil section 7a in the principal scanning direction along a guiding axis 7b, driven by the magnetic force generated by the flow of current through the drive coil 7c (not shown in FIG. 17) included in the coil section 7a of the driving section 7. The reader unit 2 is driven in the opposite direction if the polarity of the current is changed.

Unlike the pattern image reader device 100, the reader unit 2 of the pattern image reader device 102 is provided with a control pin 73 which is inserted into a guide hole 74a on the back side of a longitudinal guide plate 74, the guide hole 74a being carved out of the longitudinal guide plate 74 which stands out from the coil section 7a and extending vertically (auxiliary scanning direction). This enables the reader unit 2 to move vertically on the back side of the longitudinal guide plate 74.

On the front side of the longitudinal guide plate 74 is provided a control panel 75 having a slit 75a. The control pin 73 provided to the reader unit 2 is inserted in the slit 75a also. The slit 75a is determined by obtaining the acceleration characteristics of the drive coil 7c in advance and designing based on those characteristics so that the reader unit 2 can read almost the same line on the transfer and transport belt 26 even when the transfer and transport belt 26 is rotating.

This allows the reader unit 2 to move in the auxiliary scanning direction as well as in the principal scanning direction when the coil section 7a moves in the principal scanning direction along the guide axis 7b. FIG. 18 schematically shows a scanning track 70 of the reading unit 2 scanning on the transfer and transport belt 26.

The configuration enables the pattern image reader device 102 of the present color digital copying machine to precisely read the size of the dot image D on the transfer and transport belt 26 in the auxiliary scanning direction without diagonally reading the dot image D even if the reader unit 2 is accelerated relatively slowly.

As laid out so far, the pattern image reader device in accordance with the present invention, incorporated in an image forming apparatus, the pattern image reader device including:
a pattern image reading sensor including:
a semiconductor laser for irradiating the image carrier body with light;
a lens for converging the light from the semiconductor laser at the image carrier body; and
a light receiving element for receiving reflected light from the image carrier body and generating for output an electric signal that changes with the amount of light received, and measuring means for obtaining a size or position of the pattern image in a direction in which the pattern image reading sensor and the image carrier body change relative positions thereof according to a change in output of the light receiving element with the change in the relative positions.

Thus, it becomes possible to detect the sizes of basic pixels for a digital copying machine and printer having a resolution of a few hundred dpi. Therefore, the pattern image reader device, when used, for example, for a process control for stabilizing an image for an image forming apparatus effecting multiple tone display by varying the sizes of the basic pixels, can effectively execute a process control.

The pattern image reader device in accordance with the present invention having the arrangement as above preferably includes:
drive means for moving the pattern image reading sensor in a predetermined direction;
position detection means for detecting a position of the pattern image reading sensor during the movement; and
control means for controlling a timing for the measuring means to sample the output of the light receiving element according to a result of the detection by the position detection means.

Hence, even if the pattern image reading sensor does not move at a constant speed, the sampling (reading) position can be precisely recognized, and hence the size and position of the pattern image can be precisely obtained. In other words, cheaper driving means for the pattern image reading sensor becomes available.

The pattern image reader device in accordance with the present invention is preferably further arranged in the arrangement above so that the position detection means includes:
a position reference pattern disposed corresponding to a pattern image forming position on the image carrier body; and
a position reference pattern reading sensor moving integrally with the pattern image reading sensor and including: a semiconductor laser for irradiating the position reference pattern with light; a lens for converging the light from the semiconductor laser at the position reference pattern; and a light receiving element for receiving reflected light from the position reference pattern and generating for output an electric signal that changes with the amount of light received.

Thus, the position of the pattern image reading sensor is surely obtained, and the position detection means can be easily realized.

In any of the above arrangements, the pattern image reader device in accordance with the present invention is preferably such that power stabilizer means is provided to the semiconductor laser for stabilizing laser power, and laser is used for reading when the laser power is stabilized.

With the arrangement, the size and position of the pattern image is precisely obtained even if laser light with which the amount of light tends to change is used.

Besides, the image stabilizer device in accordance with the present invention includes:
dot image forming means for forming a visual image of one dot on the photoreceptor body;
dimension measuring means for measuring a dimension in a principal scanning direction of the dot image formed by the dot image forming means either directly on the photoreceptor body or on a transfer medium onto which the dot image is transferred; and
control means for controlling image forming conditions according to the dimension of the dot image in the principal scanning direction measured by the dimension measuring means.

With the above arrangement, the image is stabilized by the control means controlling image forming conditions according to the dimension measured of the dot image in the principal scanning direction. Therefore, the image stabilizer device, when being incorporated in an image forming apparatus varying the sizes of the basic pixels through variations in irradiation time with write-in light, can effectively control image forming conditions, effectively execute a process control, and improve the image quality.

The image stabilizer device in accordance with the present invention is preferably further arranged in the above arrangement so that the dimension measuring means includes:
a first optical sensor capable of reading an area smaller than the dot image in a single reading;
drive means for moving the first optical sensor in the principal scanning direction;
measuring means for obtaining the dimension of the dot image in the principal scanning direction according to a change in output of the first optical sensor caused by a change in position of the first optical sensor and either the photoreceptor body or the transfer medium.

With the arrangement, the drive means the first optical sensor in the principal scanning direction, and the measuring means monitors the output of the first optical sensor during the movement to obtain the dimension of the dot image in the principal scanning direction.

It thus becomes possible to obtain the dimension of the dot image in the principal scanning direction by monitoring the output of the first optical sensor during the movement, and to realize the dimension measurement means easily.

The image stabilizer device in accordance with the present invention is preferably further arranged in the above arrangement so that, in order to obtain the dimension of the dot image in the principal scanning direction, the drive means shifts the first optical sensor to a plurality of different points while moving the first optical sensor in the principal scanning direction, and the measuring means samples outputs of the first optical sensor at the points and obtains the dimension according to the samplings.

In such a case to obtain the dimension of the dot image in the direction in which the optical sensor is moved through variations in the output of the first optical sensor, the dimension of the dot image can be obtained precisely by sampling the outputs at those points.

The image stabilizer device in accordance with the present invention is preferably further arranged in the above arrangement so that the measuring means obtains the dimension according only to outputs above a predetermined level among the sampled outputs of the first optical sensor.

If the toner image has in its neighborhood a toner image substantially smaller than the dot diameter due to, for example, toner dispersion, the first optical sensor reads the smaller toner, possibly resulting in incorrect outputs. So, as in the above arrangement, by obtaining the dot diameter according only to outputs above a predetermined level among the sampled outputs of the first optical sensor, such a problem can be deflected, and the dimension of the dot image can be obtained more precisely.

The image stabilizer device in accordance with the present invention is preferably further arranged in the above arrangement to include:

position detection means for detecting a position of the first optical sensor during the movement; and control means for controlling a timing for the measuring means to sample the outputs of the first optical sensor according to a result of the detection by the position detection means.

In a case where the first optical sensor is moved, the size of the dot image can be obtained according to the results of sampling the output of the first optical sensor every predetermined period of time and the distance by which the first optical sensor is moved during that period. However, in such a case, if the first optical sensor does not move at a constant speed, it becomes difficult to measure the distance covered during the predetermined period of time precisely, and thus to measure the dimension of the dot image.

With the above arrangement, i.e., by detecting the position of the first optical sensor during the movement with the position detection means, and controlling with the controlling means the timing to sample the output of the first optical sensor, even if the first optical sensor does not move at a constant speed, the sampling (reading) position can be precisely recognized, and hence the dimension of the dot image can be precisely obtained.

The following is a description of an example of the position detection means.

The image stabilizer device in accordance with the present invention is preferably further arranged in the above arrangement so that the position detection means includes:

a position reference pattern disposed corresponding to a forming position for the dot image formed on the image carrier body; and a second optical sensor, moving integrally with the first optical sensor, for reading the position reference pattern.

With the arrangement, the position of the first optical sensor is surely obtained by the position reference pattern disposed corresponding to a pattern image forming position on the image carrier body with the second optical sensor that has the same arrangement as, and is driven integrally with, the first optical sensor.

The position of the first optical sensor can be thus surely obtained, the position detection means can be easily realized.

The image stabilizer device in accordance with the present invention is preferably further arranged in the above arrangement so that the drive means moves the first optical sensor in an auxiliary scanning direction as well at almost the same speed of either the photoreceptor body on which the dot image is formed or the transfer medium onto which the dot image is transferred.

With the arrangement, since the first optical sensor is moved in an auxiliary scanning direction as well at almost the same speed of either the photoreceptor body on which the dot image is formed or the transfer medium onto which the dot image is transferred, it becomes possible to stably scan the object to be measured even if the speed of the sensor does not increase rapidly on, for example, the starting of the driving of the sensor.

The image stabilizer device in accordance with the present invention is preferably further arranged in the above arrangement so that the dot image forming means, in order to form the dot image on the photoreceptor body, also forms a pattern image for timing for determining a timing for the first optical sensor to commence reading the dot image, and includes control means for controlling a movement starting timing to move the first optical sensor according to a result of the detection of the pattern image for timing by the first optical sensor.

With the arrangement, the control means controls the movement starting timing to move the first optical sensor according to a result of the detection of the pattern image for timing by the first optical sensor. Therefore, the first optical sensor can be moved precisely to the reading starting position prior to the start of the reading. Consequently, it is possible to read the dimension of the dot image precisely without adjustment taking into consideration effect by, for example, inconsistency in the attachment of various components of the image forming apparatus.

The following two arrangements are examples for the first and second optical sensors incorporated in the image stabilizer device in accordance with the present invention.

The image stabilizer device in accordance with the present invention is preferably further arranged in the above arrangement so that the first optical sensor includes:

a semiconductor laser for irradiating with light the transfer medium or the photoreceptor body on which the pattern image is formed;

a lens for converging the light from the semiconductor laser at the photoreceptor body or the transfer medium; and a light receiving element for receiving reflected light from the photoreceptor body or the transfer medium and generating for output an electric signal that changes with the amount of light received.

With the arrangement, measurement becomes possible on the order of microns. Therefore, the first optical sensor in the image stabilizer device in accordance with the present invention is easily realized.

Besides, the image stabilizer device in accordance with the present invention is preferably further arranged in the above arrangement so that the second optical sensor includes:

a semiconductor laser for irradiating the position reference pattern with light;

a lens for converging the light from the semiconductor laser at the position reference pattern; and a light receiving element for receiving reflected light from the position reference pattern and generating for output an electric signal that changes with the amount of light received.

With the arrangement, measurement becomes possible on the order of microns. Therefore, the first optical sensor in the image stabilizer device in accordance with the present invention is easily realized.

The image stabilizer device in accordance with the present invention is preferably further arranged in the above arrangement so that the image forming apparatus conducts multitone display by changing sizes of basic pixels with a change in an irradiation time for the write-in light.

As mentioned above, the image stabilizer device in accordance with the present invention is the image stabilizer device in accordance with the present invention is suitable to an image forming apparatus with which the sizes of basic pixels are controlled through a change in an irradiation time for the write-in light. Therefore, the image stabilizer device, when incorporated in an image forming apparatus that conducts multitone display by changing sizes of basic pixels with a change in an irradiation time for the write-in light, realizes a specially effective process control and produces high quality images.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A pattern image reader device, comprising:
    pattern image reader means for irradiating with light a pattern image for measurement use formed on an image carrier body, receiving reflected light from the pattern image for measurement use, and reading the pattern image for measurement use according to an amount of light received;
    wherein the pattern image reader means includes:
        a semiconductor laser for irradiating the image carrier body with light;
        light converging means for converging the light from the semiconductor laser at the pattern image for measurement use;
        a light receiving element for receiving reflected light from the image carrier body and generating for output an electric signal that changes with an amount of the light received; and
        power stabilizer means for maintaining the amount of light generated by the semiconductor laser; and
    measuring means for sampling, every predetermined period of time, the amount of light received that changes with a relative movement of the pattern image reader means and the image carrier body, and obtaining a size or position of the pattern image for measurement use in a direction of the relative movement according to a result of the sampling and a distance covered by the relative movement during the predetermined period of time.

2. The pattern image reader device as defined in claim 1, further comprising:
    drive means for moving the pattern image reader means in the direction of the relative movement,
    wherein the drive means includes a coil section attached integrally to the pattern image reader means and a guide axis having an axis direction along the direction of the relative movement, and moves along the guide axis in accordance with electric current flowing through the coil section.

3. The pattern image reader device as defined in claim 2, further comprising:
    position detection means for detecting a position of the pattern image reader means during the relative movement; and
    control means for controlling the timing for the measuring means to sample the output of the light receiving element according to a result of the detection by the position detection means.

4. The pattern image reader device as defined in claim 3, wherein the position detection means includes:
    a position reference pattern disposed corresponding to a pattern image forming position on the image carrier body; and
    a position reference pattern reading sensor moving integrally with the pattern image reading sensor and including: a semiconductor laser for irradiating the position reference pattern with light; a lens for converging the light from the semiconductor laser at the position reference pattern; and a light receiving element for receiving reflected light from the position reference pattern and generating for output an electric signal that changes with the amount of light received.

5. A pattern image reader device, comprising:
    pattern image reader means for irradiating with light a pattern image for measurement use formed on an image carrier body, receiving reflected light from the pattern image for measurement use, and reading the pattern image for measurement use according to an amount of light received;
    wherein the pattern image for measurement use is such that dot images of a plurality of tones with different lengths in the direction of the relative movement are provided at predetermined intervals therebetween in a direction perpendicular to the direction of the relative movement; and
    measuring means for sampling, every predetermined period of time, the amount of light received that changes with a relative movement of the pattern image reader means and the image carrier body, and obtaining a size or position of the pattern image for measurement use in a direction of the relative movement according to a result of the sampling and a distance covered by the relative movement during the predetermined period of time.

6. The pattern image reader device as defined in claim 5, further comprising:
    the pattern image for measurement use further includes a pattern image for timing for determining a timing to commence reading the dot image.

7. The pattern image reader device as defined in claim 6, wherein the pattern image for timing is composed of:
    linear pattern images provided respectively corresponding to the dot images and being distanced from the centers of the dot images by predetermined distances; and
    a rectangular flat color pattern image provided with longer sides being in a direction perpendicular to the direction of the relative movement so that one of the longer sides is distanced from the centers of the dot images by predetermined distances.

8. An image stabilizer device incorporated in an image forming apparatus for conducting multitone display by changing sizes of basic pixels, the image forming apparatus including radiation time chancing means for changing radiation time of write-in light according to input
    the image stabilizer device comprising:
        pattern image reader means for irradiating with light a pattern image for measurement use formed on an image carrier body, receiving reflected light from the pattern image for measurement use, and reading the pattern image for measurement use according to an amount of light received;

measuring means for sampling, every predetermined period of time, the amount of light received that changes with a relative movement of the pattern image reader means and the image carrier body, obtaining a size of the pattern image for measurement use in a direction of the relative movement according to a result of the sampling and a distance covered by the relative movement during the predetermined period of time, controlling image forming conditions for the image forming apparatus according to relation of the obtained size of the pattern image for measurement use and the input of the radiation time changing means; and applied voltage control means for controlling voltage applied to a developing device of the image forming apparatus, wherein the applied voltage control means raises an upper limit of the input to the radiation time changing means.

9. An image stabilizer device incorporated in an image forming apparatus for conducting multitone display by changing sizes of basic pixels, the image forming apparatus including radiation time changing means for changing radiation time of write-in light according to input the image stabilizer device comprising:

pattern image reader means for irradiating with light a pattern image for measurement use formed on an image carrier body, receiving reflected light from the pattern image for measurement use, and reading the pattern image for measurement use according to an amount of light received;

measuring means for sampling, every predetermined period of time, the amount of light received that changes with a relative movement of the pattern image reader means and the image carrier body, obtaining a size of the pattern image for measurement use in a direction of the relative movement according to a result of the sampling and a distance covered by the relative movement during the predetermined period of time, controlling image forming conditions for the image forming apparatus according to relation of the obtained size of the pattern image for measurement use and the input of the radiation time changing means; and drive means for moving the pattern image reader means in the direction of the relative movement; and position detection means for detecting a position of the pattern image reader means during the relative movement, wherein the control means controls a timing for the measuring means to sample the amount of light received according to a result of the detection by the position detection means.

10. An image stabilizer device incorporated in an image forming apparatus for conducting multitone display by changing sizes of basic pixels, the image forming apparatus including radiation time changing means for changing radiation time of write-in light according to input the image stabilizer device comprising:

pattern image reader means for irradiating with light a pattern image for measurement use formed on an image carrier body, receiving reflected light from the pattern image for measurement use, and reading the pattern image for measurement use according to an amount of light received, wherein the pattern imagine for measurement use is such that dot images of a plurality of tones with different lengths in the direction of the relative movement are provided at predetermined intervals therebetween in a direction perpendicular to the direction of the relative movement; and measuring means for sampling, every predetermined period of time, the amount of light received that changes with a relative movement of the pattern image reader means and the image carrier body, obtaining a size of the pattern image for measurement use in a direction of the relative movement according to a result of the sampling and a distance covered by the relative movement during the predetermined period of time, controlling image forming conditions for the image forming apparatus according to relation of the obtained size of the pattern image for measurement use and the input of the radiation time changing means.

11. The image stabilizer device as defined in claim 10, wherein the pattern image for measurement use further includes a pattern image for timing for determining a timing to commence reading the dot images, the pattern image for timing is composed of:

linear pattern images provided respectively corresponding to the dot images and to being distanced from the centers of the dot images by predetermined distances; and a rectangular flat color pattern image provided with longer sides thereof being in a direction perpendicular to the direction of the relative movement so that one of the longer sides is distanced from the centers of the dot images by predetermined distances, and the control means controls the timing to move the pattern image reader means according to the detection of the pattern image for timing.

12. An image stabilizer device incorporated in an image forming apparatus for conducting multitone display by changing sizes of basic pixels, the image forming apparatus including radiation time changing means for changing radiation time of write-in light according to input the image stabilizer device comprising:

pattern image reader means for irradiating with light a pattern image for measurement use formed on an image carrier body, receiving reflected light from the pattern image for measurement use, and reading the pattern image for measurement use according to an amount of light received;

measuring means for sampling, every predetermined period of time, the amount of light received that changes with a relative movement of the pattern image reader means and the image carrier body, obtaining a size of the pattern image for measurement use in a direction of the relative movement according to a result of the sampling and a distance covered by the relative movement during the predetermined period of time, controlling image forming conditions for the image forming apparatus according to relation of the obtained size of the pattern image for measurement use and the input of the radiation time changing means; and drive means for moving the pattern image reader means in the direction of the relative movement.

13. The image stabilizer device as defined in claim 12, wherein the drive means includes a coil section attached integrally to the pattern image reader means and a guide axis having an axis direction along the direction of relative movement, and moves along the guide axis in accordance with electric current flowing through the coil section, the image stabilizing device further comprising:
a vertical guide member provided to the coil section and having a guide hole extending in a direction perpendicular to the direction of relative movement; and
a restriction member, provided to the pattern image reader means in a direction perpendicular to the axis direction, for moving along the guide hole
wherein the pattern image reader means moves in the direction perpendicular to the direction of relative movement as well at almost the same speed with that of the image carrier body.

14. A pattern image reader device, incorporated in an image forming apparatus, for reading a pattern image formed on an image carrier body and obtaining a size or position of the pattern image, the pattern image reader device comprising:
a pattern image reading sensor including:
a semiconductor laser for irradiating the image carrier body with light;
a lens for converging the light from the semiconductor laser at the image carrier body; and
a light receiving element for receiving reflected light from the image carrier body and generating for output an electric signal that changes with the amount of light received, and
measuring means for obtaining a size or position of the pattern image in a direction in which the pattern image reading sensor and the image carrier body change relative positions thereof according to a change in output of the light receiving element with the change in the relative positions.

15. The pattern image reader device as defined in claim 14, further comprising:
drive means for moving the pattern image reading sensor in a predetermined direction;
position detection means for detecting a position of the pattern image reading sensor during the movement; and
control means for controlling a timing for the measuring means to sample the output of the light receiving element according to a result of the detection by the position detection means.

16. The pattern image reader device as defined in claim 15,
wherein the position detection means includes:
a position reference pattern disposed corresponding to a pattern image forming position on the image carrier body; and
a position reference pattern reading sensor moving integrally with the pattern image reading sensor and including: a semiconductor laser for irradiating the position reference pattern with light; a lens for converging the light from the semiconductor laser at the position reference pattern; and a light receiving element for receiving reflected light from the position reference pattern and generating for output an electric signal that changes with the amount of light received.

17. The image pattern reader device as defined in claim 14,
wherein power stabilizer means is provided to the semiconductor laser for stabilizing laser power, and laser is used for reading when the laser power is stabilized.

18. The image stabilizer device as defined in claim 14, wherein the image carrier body is from the group consisting of a photoreceptor body and a transfer belt.

19. An image stabilizer device, incorporated in an image forming apparatus including an image forming section,
the image stabilizer device being for stabilizing an image by controlling image forming conditions for the image forming section,
the image forming section being for forming an image by writing an electrostatic latent image through irradiation of a photoreceptor body with light and then visualizing the electrostatic latent image through development thereof,
the image forming apparatus having an arrangement in which sizes of basic pixels are changed by changing an irradiation time for the write-in light,
the image stabilizer device comprising:
dot image forming means for forming a visual image of one dot on the photoreceptor body;
dimension measuring means for measuring a dimension in a principal scanning direction of the dot image formed by the dot image forming means either directly on the photoreceptor body or on a transfer medium onto which the dot image is transferred; and
control means for controlling image forming conditions according to the dimension of the dot image in the principal scanning direction measured by the dimension measuring means.

20. The image stabilizer device as defined in claim 19,
wherein the dimension measuring means includes:
a first optical sensor capable of reading an area smaller than the dot image in a single reading;
drive means for moving the first optical sensor in the principal scanning direction;
measuring means for obtaining the dimension of the dot image in the principal scanning direction according to a change in output of the first optical sensor caused by a change in position of the first optical sensor and either the photoreceptor body or the transfer medium.

21. The image stabilizer device as defined in claim 20,
wherein, in order to obtain the dimension of the dot image in the principal scanning direction, the drive means moves the first optical sensor in the principal scanning direction to a plurality of different points, and the measuring means samples outputs of the first optical sensor at the points and obtains the dimension according to samplings.

22. The image stabilizer device as defined in claim 21,
wherein the measuring means obtains the dimension according only to outputs above a predetermined level among the sampled outputs of the first optical sensor.

23. The image stabilizer device as defined in claim 20, further comprising:
position detection means for detecting a position of the first optical sensor during the movement; and
control means for controlling a timing for the measuring means to sample the outputs of the first optical sensor according to a result of the detection by the position detection means.

24. The image stabilizer device as defined in claim 23,
wherein the position detection means includes:
a position reference pattern adjacent a forming position for the image formed on the image carrier body; and
a second optical sensor, moving integrally with the first optical sensor, for reading the position reference pattern.

25. The image stabilizer device as defined in claim 24, wherein the second optical sensor includes:
- a semiconductor laser for irradiating the position reference pattern with light;
- a lens for converging the light from the semiconductor laser at the position reference pattern; and
- a light receiving element for receiving reflected light from the position reference pattern and generating for output an electric signal that changes with the amount of light received.

26. The image stabilizer device as defined in claim 20, wherein the drive means moves the first optical sensor in an auxiliary scanning direction as well at almost the same speed of either the photoreceptor body on which the dot image is formed or the transfer medium onto which the dot image is transferred.

27. The image stabilizing device as defined in claim 20, wherein the dot image forming means, in order to form the dot image on the photoreceptor body, also forms a pattern image for timing for determining a timing for the first optical sensor to commence reading the dot image, and includes control means for controlling a movement starting timing to move the first optical sensor according to a result of the detection of the pattern image for timing by the first optical sensor.

28. The image stabilizer device as defined in claim 20, wherein the first optical sensor includes:
- a semiconductor laser for irradiating with light the transfer medium or the photoreceptor body on which the pattern image is formed;
- a lens for converging the light from the semiconductor laser at the photoreceptor body or the transfer medium; and
- a light receiving element for receiving reflected light from the photoreceptor body or the transfer medium and generating for output an electric signal that changes with the amount of light received.

29. The image stabilizer device as defined in claim 19, wherein the image forming apparatus conducts multitone display by changing sizes of basic pixels with a change in an irradiation time for the write-in light.

* * * * *